United States Patent
Delp et al.

(10) Patent No.: US 6,453,434 B2
(45) Date of Patent: Sep. 17, 2002

(54) DYNAMICALLY-TUNABLE MEMORY CONTROLLER

(75) Inventors: Gary Scott Delp; Gary Paul McClannahan, both of Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/938,161

(22) Filed: Aug. 23, 2001

Related U.S. Application Data

(60) Division of application No. 09/247,501, filed on Feb. 10, 1999, which is a continuation-in-part of application No. 09/166,004, filed on Oct. 2, 1998.

(51) Int. Cl.[7] .............................................. G11C 29/00
(52) U.S. Cl. ...................... 714/718; 711/167; 710/240; 365/194
(58) Field of Search ...................... 711/157, 167–169; 710/40, 45, 240; 712/245; 713/401; 714/718; 365/194, 230.03; 707/2

(56) References Cited

U.S. PATENT DOCUMENTS

| | | | |
|---|---|---|---|
| 4,063,308 A | 12/1977 | Collins et al. | 364/200 |
| 5,276,858 A | 1/1994 | Oak et al. | 395/550 |
| 5,809,340 A | 9/1998 | Bertone et al. | 395/878 |
| 6,088,774 A | 7/2000 | Gillingham | 711/167 |
| 6,173,345 B1 * | 1/2001 | Stevens | 710/100 |
| 6,338,148 B1 * | 1/2002 | Gillenwater et al. | 714/25 |

FOREIGN PATENT DOCUMENTS

| | | | |
|---|---|---|---|
| EP | 0 339 224 A2 | 11/1989 | G11C/7/00 |
| WO | WO 97/10538 | 3/1997 | G06F/1/04 |

* cited by examiner

Primary Examiner—Matthew Kim
Assistant Examiner—Pierre M. Vital
(74) Attorney, Agent, or Firm—Wood, Herron & Evans; Scott A. Stinebruner

(57) ABSTRACT

A memory controller circuit arrangement and method utilize a tuning circuit that dynamically controls the timing of memory control operations, rather than simply relying on fixed timing parameters that are either hardwired or initialized upon startup of a memory controller. Dynamic control over the timing of memory control operations typically incorporates memory test control logic that verifies whether or not a memory storage device will reliably operate using the dynamically-selected values of given timing parameters. Then, based upon the results of such testing, such dynamically-selected values are selectively updated and retested until optimum values are found. The dynamically-selected values may be used to set one or more programmable registers, each of which may in turn be used to control the operation of a programmable delay counter that enables a state transition in a state machine logic circuit to initiate performance of a memory control operation by the logic circuit. Dynamic tuning may also utilize a unique binary search engine circuit arrangement that updates one of two registers with an average of the current values stored in such registers based upon the result of a test performed using that average value. By selectively updating such registers, a fast convergence to an optimum value occurs with minimal circuitry.

9 Claims, 11 Drawing Sheets

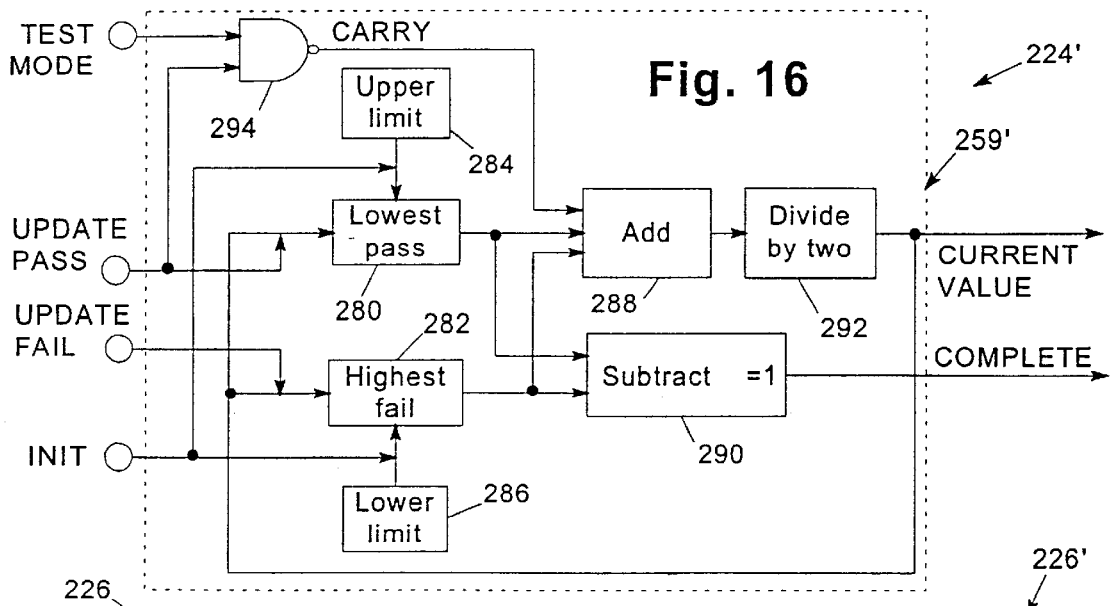
Fig. 16
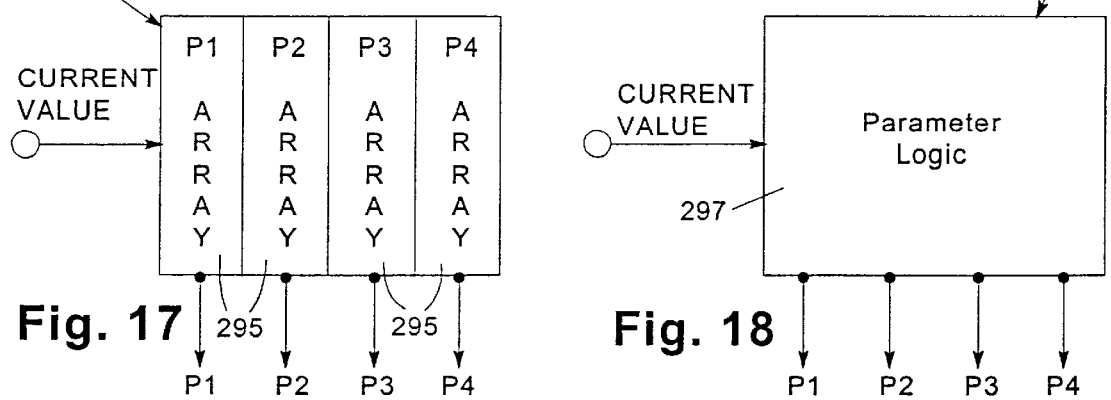
Fig. 17
Fig. 18
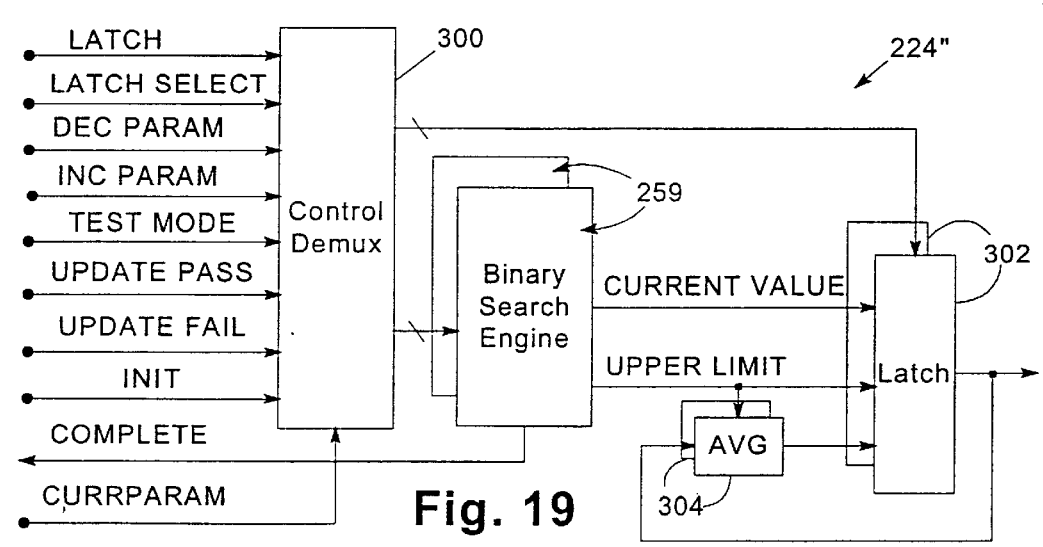
Fig. 19

DYNAMICALLY-TUNABLE MEMORY CONTROLLER

CROSS-REFERENCE TO RELATED APPLICATIONS

This application is a divisional of U.S. patent application Ser. No. 09/247,501, filed on Feb. 10, 1999 by Gary Scott Delp et al. and entitled "DYNAMICALLY-TUNABLE MEMORY CONTROLLER", which is a continuation-in-part of U.S. patent application Ser. No. 09/166,004, filed on Oct. 2, 1998 by Gary Paul McClannahan, entitled, "MEMORY CONTROLLER WITH PROGRAMMABLE DELAY COUNTER FOR TUNING PERFORMANCE BASED ON TIMING PARAMETER OF CONTROLLED MEMORY STORAGE DEVICE", which applications are incorporated by reference herein.

FIELD OF THE INVENTION

The invention is generally related to integrated circuit device architecture and design, and in particular to the architecture and design of a memory controller for controlling data transfer with a memory storage device.

BACKGROUND OF THE INVENTION

Computers and other data processing systems rely extensively on various memories to store information used by such systems in performing computer tasks. A memory may be used, for example, to store a portion of a computer program that is executed by a computer, as well as the data that is operated upon by the computer.

Memories may also be found in many of the components of a computer. For example, a microprocessor, the "brains" of a computer, may have a dedicated cache memory that permits faster access to certain data or computer instructions than otherwise available from the main memory of the computer. Also, dedicated memory may be used by a graphics controller to store the information to display on a computer monitor or other display.

Memories may also be found in many types of interfaces for a computer, e.g., to interface a computer with other computers via an external network. The interfaces are typically implemented using dedicated hardware, e.g., a network adapter card that plugs into the computer and has the necessary connectors for connecting to a particular type of network. A controller is typically used to handle the transfer of data between the computer and the network, and a dedicated memory is typically used to store control data used by the controller, as well as a temporary copy of the data being transmitted over the interface.

Memory used in the above applications are typically implemented using one or more solid-state memory storage devices, or "chips". A dedicated memory controller is typically used to handle the data transfer to and from such memory storage devices according to a predefined protocol.

Memory storage devices typically have one or more timing characteristics that define the minimum delays that one must wait before performing certain operations with the devices. Timing parameters, related to such characteristics, are thus defined for specific memory storage device implementations. These timing parameters are often limited by the physical structures of the devices, and are defined by the designers of the devices to ensure reliable operation of the devices. As but one example, one type of memory storage device, a dynamic random access memory (DRAM) device, requires that circuitry within the device be "precharged" for at least a predetermined time before data can be read from the device. Should the timing parameter associated with this characteristic for a specific memory storage device implementation not be met, errors may occur in the device, which could jeopardize the validity of the data.

Different types of memory storage devices may have different timing parameters. Moreover, as technology improves, memory storage devices of a given type may be improved over past designs, and as a result may have different timing parameters from the past designs.

To control data transfer with a given type of memory storage device, a memory controller must often be specifically tailored to meet the various timing parameters for that device. To ensure the best possible performance with a given type of memory storage device, it is often desirable for the memory controller to set the delays between various memory control operations to meet or only slightly exceed the timing parameters defined for the device.

Some memory controllers, however, may need to be used with different types of memory storage devices. For example, it may be desirable to support multiple types of memory storage devices so that the memory controller may be used in different applications. However, to support multiple types of memory storage devices often necessitates that a memory controller be designed to handle the worst case timing parameters of a given memory storage device, since the timing parameters typically define minimum acceptable delays. As a result, when a memory controller is used with a memory storage device having timing parameters that offer faster performance than the worst case timing parameters defined for the controller, the memory storage device is operated at below its maximum performance level, and the improved performance that could otherwise be realized by the device is lost.

Some conventional memory controller designs attempt to support different timing parameters for a given timing characteristic by controllably inserting one or more "wait states" into a memory access operation to account for a performance mismatch between the controller and a memory storage device. Typically, such controller designs support one of two timing parameters by controllably selecting one of two possible "paths" of execution.

Specifically, a memory controller typically operates using a state machine that cycles between different "stages" to perform different memory control operations associated with controlling the data transfer with a memory storage device. The state machine is timed by a clock signal that defines the time to wait between each stage. A path of execution is defined by the sequence of stages that are sequentially performed in the state machine when following the path.

An important limitation of such conventional memory controller designs is that supporting a second path of execution can significantly increase the complexity of the state machine, which tends to increase the overall cost and complexity of the controller. Moreover, the complexity of the state machine increases dramatically as the number of execution paths increases. Furthermore, if it is desirable to support variable timing parameters for multiple timing characteristics, the complexity of the state machine increases at an even greater rate. As a result, conventional memory controller designs are typically limited to supporting only a very few timing parameters for only a very few timing characteristics.

Furthermore, due to the inability of conventional memory controller designs to support a wide variety of memory storage devices, it is often not cost-effective to anticipate the use of such designs with future memory storage devices that may have shorter timing parameters, and as a result improved performance, over current devices. Consequently, often new memory controller designs must be developed in response to advances in memory storage device technology.

As an additional limitation, conventional memory controller designs typically operate using static, or fixed, timing parameters that are either fixed in the design or programmed with preset values at startup, e.g., through tying one or more mode selection inputs to power and/or ground. Optimizing a statically-configured memory controller for use in a particular design requires that a designer know all of the relevant timing parameters of the memory storage devices to be used with that design. In some instances, however, a designer may not know all relevant timing parameters. Also, in some instances, individual memory storage devices may not conform to the timing characteristics defined for those types of devices, which might result in failures in manufactured circuits that use such non-conforming devices.

Therefore, a significant need continues to exist for a more flexible and extensible memory controller design that is capable of supporting a wider variety of memory storage devices while maintaining optimal performance.

SUMMARY OF THE INVENTION

The invention addresses these and other problems associated with the prior art by providing a memory controller circuit arrangement and method that utilize a tuning circuit that dynamically controls the timing of memory control operations, rather than simply relying on fixed timing parameters that are either hardwired or initialized upon startup of a memory controller. As such, optimum timing parameters can often be determined without prior knowledge of the performance characteristics of particular memory storage devices.

Various embodiments of the invention dynamically control the timing of memory control operations by incorporating memory test control logic that verifies whether or not a memory storage device will reliably operate using the dynamically-selected values of given timing parameters. Then, based upon the results of such testing, such dynamically-selected values are selectively updated and retested until optimum values are found. Moreover, when multiple timing parameters are dynamically controlled, values for such timing parameters may be determined jointly and/or independently.

With additional embodiments, dynamically-selected values may be used to set one or more programmable registers. Each programmable register may be used to control the operation of a programmable delay counter that enables a state transition in a state machine logic circuit to initiate performance of a memory control operation by the logic circuit. In such embodiments, a single path of execution in the logic circuit is typically used to support any number of timing parameter variations for a particular timing characteristic. Moreover, through the use of multiple programmable delay counters, and multiple programmable registers therefor, multiple timing characteristics may be optimized and adjusted within the same path of execution. Consequently, a wide variety of timing characteristics and timing parameters therefor may be supported in a single integrated design, offering greater flexibility and extensibility than conventional designs.

Therefore, consistent with one aspect of the invention, a memory controller circuit arrangement is provided, including a logic circuit configured to control data transfer with at least one memory storage device by performing first and second memory control operations; and a tuning circuit coupled to the logic circuit and configured to dynamically controlling the delay between the first and second memory control operations.

Consistent with an additional aspect of the invention, a method is provided for controlling data transfer with a memory storage device using a memory controller. The method includes dynamically selecting a selected value among a plurality of values to delay performance of a second memory control operation relative to a first memory control operation; and controlling the delay between the first and second memory control operations using the selected value.

The invention also provides in another aspect a binary search engine circuit arrangement suitable for use in determining an optimum value from a monotonically-sorted list of values. A binary search engine consistent with the invention selectively updates one of two registers with an average of the current values stored in such registers based upon the result of a test performed using that average value. As a result, the registers tend to quickly converge to separate sides of a boundary defined by the predetermined comparison criteria implemented by the test. While such a binary search engine is not specifically limited to use in connection with memory controllers and the like, one particularly useful application is in dynamically determining an optimum delay value from a sorted list of delay values used to control the relative timing of two memory control operations. As such, the predetermined comparison criteria in such an application is whether or not a memory storage device passes or fails a memory test performed with the device.

A circuit arrangement consistent with this aspect of the invention includes first and second registers respectively configured to store first and second values from a list of values; an averaging circuit coupled to receive the first and second values stored in the first and second registers, and to output as a test value an average of the first and second values; a test circuit, coupled to the first and second registers, and configured to test the test value according to a predetermined comparison criteria; and a test closure circuit configured to determine when an optimum value is stored in the first register. In response to the test value meeting the predetermined comparison criteria, the first register is configured to be updated with the test value. Further, in response to the test value not meeting the predetermined comparison criteria, the second register is configured to be updated with the test value.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 1 is a block diagram of a memory controller circuit arrangement utilizing a tuning circuit consistent with the invention.

FIG. 16 is a block diagram of an alternate parameter manipulation control block design to that of FIG. 15.

FIG. 17 is a block diagram of a parameter arrays block from the dynamic tuning logic of FIG. 13.

FIG. 18 is a block diagram of a parameter logic block for use as an alternate to the parameter manipulation control block of FIG. 17.

FIG. 19 is a block diagram of another alternate parameter manipulation control block design to that of FIGS. 15 and 16.

DETAILED DESCRIPTION

Figure 2:
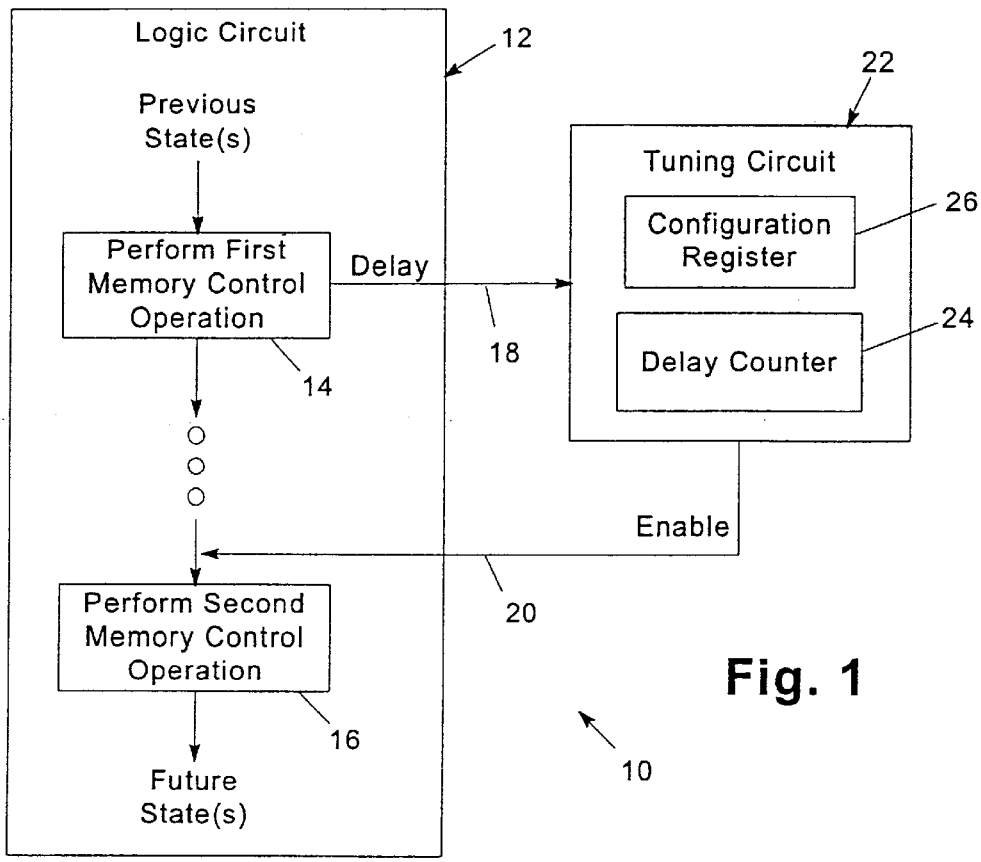
FIG. 2 is a block diagram of the programmable delay counter in the memory controller circuit arrangement of FIG. 1.

Dynamic tuning of a memory controller consistent with the invention is used to optimize the performance of the memory controller for use with different memory storage devices controlled by the memory controller. However, prior to discussing the dynamic tuning aspects of the invention, one specific implementation of a programmable memory counter, which utilizes programmable delay counters to controllably optimize a memory controller for use with a particular memory storage device, is described. As will become more apparent below, however, the invention is not limited to use in connection solely with a programmable memory controller that utilizes the programmable memory counters described herein.

The herein-described embodiments generally operate by controllably delaying performance of a memory control operation to meet a timing parameter for a memory storage device coupled to a memory controller. As such, a wide variety of solid-state (semiconductor) memory storage devices having varying timing parameters may be supported in a flexible and extensible manner, including but not limited to Synchronous Dynamic Random Access Memories (DRAM's) Enhanced Synchronous DRAM's, Rambus DRAM's, Extended Data Out (EDO) DRAM's, page-mode DRAM's, Static Random Access Memories (SRAM's), Flash Memories, Read Only Memories (ROM's), Electrically-Erasable Programmable Read Only Memories (EEPROM's), Serial EPROM's, Direct Access Storage Devices (DASD's), subsystems acting as memory, etc.

Three primary situations occur in which it may be desirable to tune the performance of a memory controller in the manner presented herein. First, it is often desirable to control the delay between asserting and deasserting signals within a given memory access cycle, e.g., the time period between asserting the row and column address strobe ($\overline{RAS}$ and $\overline{CAS}$) signals for a given memory access. Second, it is often desirable to control the delay between asserting and deasserting signals between successive memory access cycles, e.g., the delay between asserting and releasing the $\overline{RAS}$ precharge time for an EDO DRAM. Third, it is often desirable to control the delay between asserting and deasserting signals between non-successive but interrelated memory access cycles, e.g., the delays between successive accesses to a given bank in a multi-bank DRAM. Other situations will become apparent to one of ordinary skill in the art from a reading of the material herein.

As shown in FIG. 1, for example, a memory controller 10 may include a logic circuit 12, which implements a state machine having a plurality of stages, including stages 14 and 16 where first and second memory control operations are performed. It should be appreciated that logic circuit 12 may include practically any type of state machine utilized in connection with the control of memory storage devices, and may include other logic circuitry as is well known in the art. As such, an indeterminate number of stages are illustrated before and after stages 14 and 16. It should be appreciated that any number of stages, even no stages, may be interposed between stages 14 and 16 as well.

The memory control operations may represent practically any timed operations performed by a memory controller, principally including, for example, asserting or deasserting any of a number of memory control signals to a memory storage device, latching any of a number of signals received from the memory storage device, driving new data signals to the memory storage device, etc. The first and second memory control operations performed at stages 14 and 16 may also be related with one another in various manners, e.g., asserting and deasserting the same control signal, asserting or deasserting different control signals, latching the same or different signals returned from the memory storage device, etc. Moreover, the first and second memory control operations may be performed during the same memory access cycle, during successive memory access cycles, or in separate, non-successive memory access cycles.

The first and second memory control operations in the context of the invention must be separated in time by a predetermined delay associated with a timing parameter for the particular memory storage device coupled to memory controller 10. A timing parameter represents a particular value for a timing characteristic common to different memory storage devices suitable for use with the memory controller. A timing parameter may be specified as a minimum time, e.g., in nanoseconds. In the alternative, a timing parameter may be specified as a minimum number of clock cycles. Furthermore, given that a memory controller is typically operated synchronously, typically the delay inserted between the first and second memory control operations is represented by a selected number of cycles for the memory controller clock, irrespective of the units of a timing parameter.

A wide variety of timing characteristics may be relevant for different types of memory storage devices. For example, suitable timing characteristics for Synchronous DRAM's include, among others, bank cycle time ($t_{RC}$), active command period ($t_{RAS}$), data input to precharge time ($t_{DPL}$), precharge time ($t_{RP}$), $\overline{RAS}$ to $\overline{CAS}$ delay ($t_{RCD}$), $\overline{CAS}$ latency ($t_{AA}$), etc. Other timing characteristics may also exist for different types of memory storage devices. In each case, the particular timing characteristics that are relevant for a given memory storage device are typically well known in the industry, and it is typically with respect to one or more of these particular timing characteristics for which it is desirable to tune the performance of a memory controller in the manner disclosed herein.

In memory controller 10, the delay between the performance of the first and second memory control operations is controlled by asserting a delay signal at stage 14, representing a request to delay the operation of the second memory control operation for a selected number of cycles. Performance of the second memory control operation is initiated by enabling a state transition to stage 16, as represented by enable signal 20.

A tuning circuit 22, including a programmable delay counter 24 and a configuration register 26, is illustrated as receiving delay signal 18 and outputting enable signal 20. Typically, delay counter 24 is programmed to cycle a selected number of clock cycles based upon the desired number of clock cycles to wait between performing the first and second memory control operations. The selected number of clock cycles may be equal to the total number of cycles between the first and second memory control operations, or may differ, e.g., if other delays already exist between performance of the first and second memory control operations. In this latter instance, for example, assertion of the delay and/or enable signals may be offset one or more cycles from performance of the memory control operations.

It should be appreciated based upon a reading of the material herein that mechanisms other than enable signals may be used to initiate performance of the second memory control operation subsequent to the first memory control operation. Examples include, but are not limited to removal of a hold signal, a signal voltage reaching a comparison threshold, etc.

A programmable delay counter consistent with the invention is generally configured to cycle a programmed number of cycles and thereafter cause the enable signal to be asserted for the purpose of initiating performance of the second memory control operation. The delay counter is programmed based upon a delay count provided from configuration register 26. The delay count may be equal to the total number of cycles to delay, or may be a portion of the total number of cycles, e.g., if other delays are present in the counter.

Typically, a programmable delay counter consistent with the invention may be configured either as a decrement-type counter or an increment-type counter, among other variations. FIG. 2 illustrates, for example, a decrement-type implementation of the programmable delay counter 24 of tuning circuit 22, where the counter receives at its data (D) input the delay count from configuration register 26. The delay count is written into counter 24 by assertion of the write enable (WE) input via delay signal 18. Thereafter, a clock signal for the memory controller, coupled to the decrement (DEC) input of the counter, decrements the value stored in the counter once each clock cycle. Cycling of the counter for the number of cycles corresponding to the delay count is then detected via a compare-to-zero (=0) output, from which enable signal 20 is derived.

Figure 3:
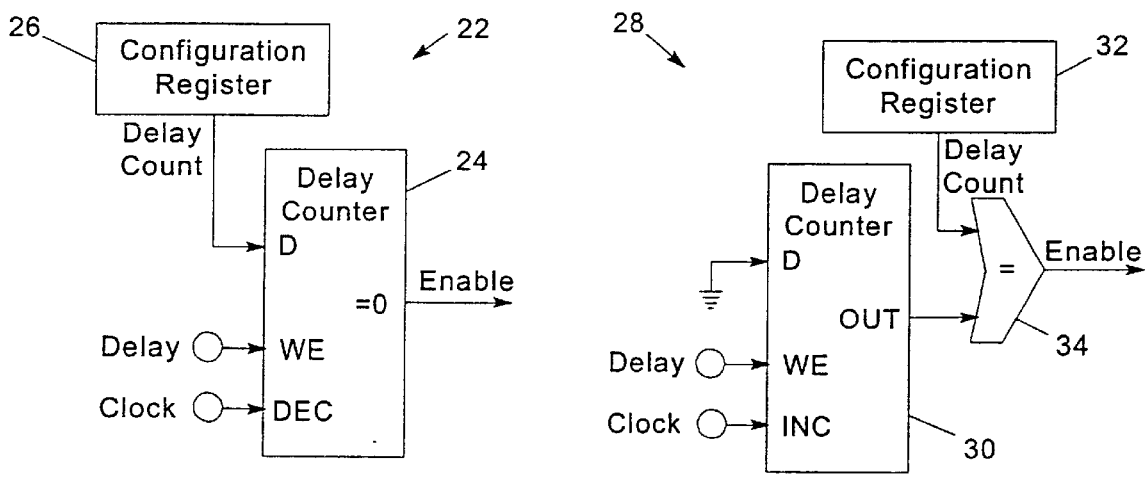
FIG. 3 is a block diagram of alternate programmable delay counter to that illustrated in FIG. 2.

An increment-type counter implementation is illustrated by tuning circuit 28 of FIG. 3, where a counter 30 is receives at its data (D) input an initial value of zero. The counter is initialized to a zero count in response to assertion of the write enable (WE) input via delay signal 18. Thereafter, the clock signal for the memory controller, coupled to the increment (INC) input of the counter, increments the value stored in the counter once each clock cycle. Cycling of the counter for the number of cycles corresponding to the delay count is then detected via a comparison block 34 that receives as its inputs the output (OUT) of counter 30 and the delay count from configuration register 32. As a result, enable signal 20 is asserted when the output of the counter matches the delay count stored in the register.

Loading of the configuration register to program the programmable counter may be performed in a number of manners. For example, one or more external pins for the controller may be used to specify the delay count. In the alternative, the delay count may be supplied via an external component, e.g., via a specific instruction over a network or bus. Moreover, the delay count may be hardwired into different physical implementations, whereby a common design of memory controller may be reused with minor modifications in the manufacture of several different memory controller models tailored for use with different memory storage requirements. Furthermore, delay counts may be grouped into sets so that the same pins/commands may collectively control multiple parameters.

Other manners of programming the programmable counter may be used in the alternative. For example, as discussed in greater detail below, a dynamic control circuit may be configured to start with one or more conservative parameters, to monitor the error rate of the memory storage device while progressively accelerating the parameters, and to then decelerate one or more of the parameters whenever errors are detected.

Returning to FIG. 1, logic circuit 12 and tuning circuit 22 each represent a circuit arrangement, that is, an arrangement of analog and/or digital electronic or optical components electrically or optically coupled with one another via conductive traces, signaling paths and/or wires, whether implemented wholly in one integrated circuit device or implemented in a plurality of integrated circuit devices electrically coupled with one another via one or more circuit boards. Moreover, it should be recognized that integrated circuit devices are typically designed and fabricated using one or more computer data files, referred to herein as hardware definition programs, that define the layout of the circuit arrangements on the devices. The programs are typically generated in a known manner by a design tool and are subsequently used during manufacturing to create the layout masks that define the circuit arrangements applied to a semiconductor wafer. Typically, the programs are provided in a predefined format using a hardware definition language (HDL) such as VHDL, verilog, EDIF, etc. Thus, while the invention has and hereinafter will be described in the context of circuit arrangements implemented in fully functioning integrated circuit devices, those skilled in the art will appreciate that circuit arrangements consistent with the invention are capable of being distributed as program products in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, and DVD's, among others, and transmission type media such as digital and analog communications links.

Figure 4:
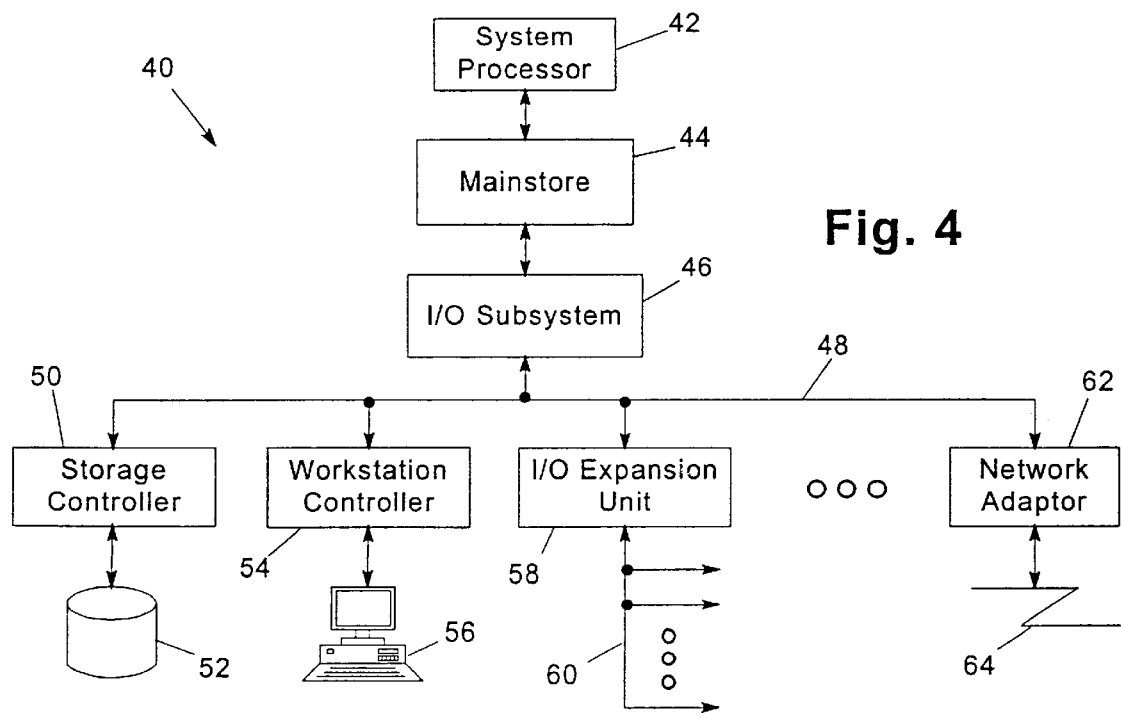
FIG. 4 is a block diagram of a data processing system consistent with the invention.

Turning now to FIG. 4, a data processing system 40 consistent with the invention is illustrated. Data processing system 40 is representative of any of a number of computers and like systems. For example, data processing system 40 includes a system processor 42 coupled to a mainstore memory 44, which is in turn coupled to various external devices via an input/output (I/O) subsystem 46. Subsystem 46 is coupled to a plurality of external devices via a system bus 48. Various types of external devices are represented in FIG. 4, including a storage controller 50 (used to interface with one or more storage devices 52), a workstation controller 54 (used to interface with one or more workstations 56), an I/O expansion unit 58 (used to interface with additional devices via an I/O bus 60), and a network adaptor 62 (used to interface with an external network represented at 64).

It should be appreciated that a wide variety of alternate devices may be coupled to data processing system 40 consistent with the invention.

Data processing system 40 may be implemented, for example, as a midrange computer system, e.g., the AS/400 midrange computer available from International Business Machines Corporation. It should be appreciated that the invention may be applicable to other computer systems, e.g., personal computers, mainframe computers, supercomputers, etc., not to mention other data processing systems that utilize a memory controller, such as embedded controllers; communications systems such as bridges, routers and switches; consumer electronic devices; and the like.

In the illustrated embodiment, a memory controller consistent with the invention is implemented in network adaptor 62, which may be, for example, an asynchronous transfer mode (ATM) adaptor suitable for connecting to an ATM network. However, it should be appreciated that the principles of the invention may be applicable to network adaptors for other types of networks, e.g., TCP/IP networks, LAN and WAN networks, frame relay networks, and the like. Moreover, it should be appreciated that a memory controller consistent with the invention may also be utilized in other components in data processing system 40, e.g., any of components 50, 54, or 58, or within the main processing structure of the data processing system. Thus, the invention should not be limited to the particular implementation disclosed herein.

Figure 5:
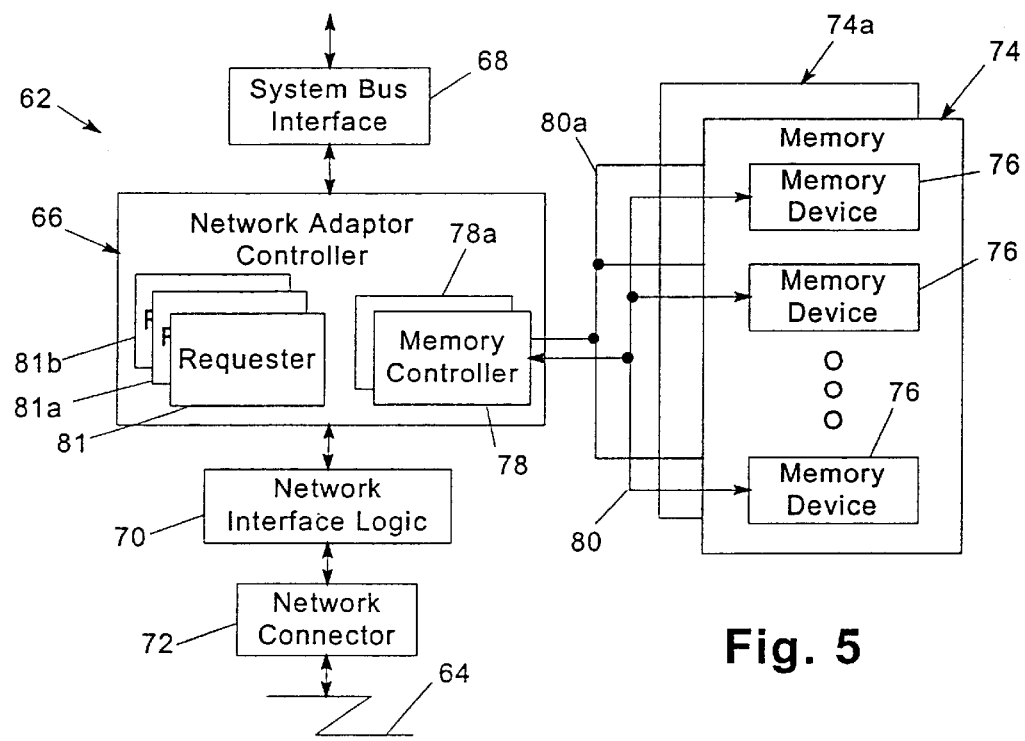
FIG. 5 is a block diagram of the network adapter in the data processing system of FIG. 4.

Network adaptor 62 is illustrated in greater detail in FIG. 5. Network adaptor 62 is under the control of a controller 66 which is interfaced with system bus 48 via a system bus interface block 68. Controller 66 is, in turn, interfaced with network 64 via network interface logic 70 and a physical network connector represented at 72.

Controller 66 relies on one or more memories, e.g., memories 74 and 74a, each comprising a plurality of memory storage devices 76. Data transfer between controller 66 and each memory 74, 74a is controlled via one or more memory controllers, e.g., memory controller 78 for memory 74, and memory controller 78a for memory 74a. A series of I/O signals (e.g., signals 80 and 80a respectively for controller 78 and 78a) are used to control the data transfer with each memory. A plurality of requesters 81, 81a, 81b are also represented in controller 66, representing various components in the controller that may request a data transfer to or from memory 74, 74a. For example, a requester may represent various components within the receive or transmit circuitry within controller 66. Moreover, a requester may also represent an external access command received by controller 66.

It should also be appreciated that any number of requesters, and memory controller/memory pairs may be disposed network adaptor 62. For example, separate packet and control memories may be utilized in network adaptor 62, thus requiring two memories and two associated memory controllers. Furthermore, it should be appreciated that a memory controller may also interface with more than one memory if desired.

Each memory storage device 76 in each memory is responsive to dedicated I/O signals provided by the associated memory controller 78, 78a, which are dictated by the design of the specific memory storage devices. Moreover, as discussed above, the memory storage devices may have one or more timing parameters providing specific minimum delays that are required to satisfy certain timing characteristics of such devices. In the illustrated embodiment, memory storage devices 76 are synchronous DRAM devices, e.g., the IBM 0364164 64-MB Synchronous DRAM's available from International Business Machines Corporation. The counting parameters and interface logic necessary for controlling the data transfer with such devices are generally known in the art.

Figure 6:
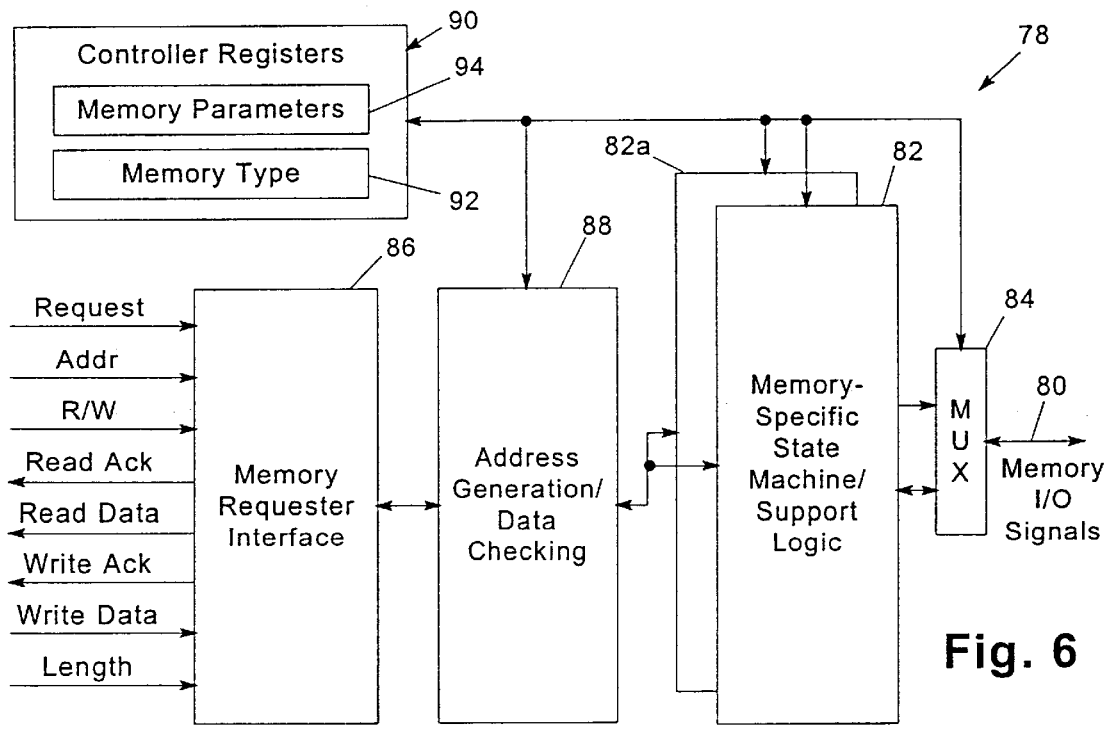
FIG. 6 is a block diagram of the memory controller in the network adapter of FIG. 5.

Memory controller 78 is illustrated in greater detail in FIG. 6, including a series of memory-specific state machine/support logic blocks 82, 82a that are coupled to the memory I/O signals 80 via a multiplexer 84. A memory requester interface 86 is configured to receive the various control signals from one or more memory requesters (not shown in FIG. 6) in a manner well known in the art. It should be appreciated that when multiple requesters are provided, additional interface logic (not shown) may be required to arbitrate between the multiple requesters. Block 86 is interfaced with an address generation/data checking block 88, which is in turn coupled to blocks 82, 82a.

Blocks 86 and 88 perform with recognized interface, data checking and address generation operations that are typically generic to various types of memory storage devices. However, in that the timing characteristics and protocols necessary for interfacing with different types of memory storage devices may differ, it may be desirable in certain memory controller designs to implement multiple memory-specific state machine/support logic blocks, e.g., as represented in FIG. 6. For example, it may be desirable to configure block 82 to control Synchronous DRAM devices, and block 82a to control SRAM devices. Other combinations of device types may be supported in the alternative.

Memory controller 78 also includes a bank of controller registers 90, including a memory type register 92 and a memory parameters register 94. Additional registers, e.g., status and error registers, interrupt registers, other control registers, and the like, may also be supported as needed.

Memory type register 92 is utilized to activate one of the available state machines in the memory controller (e.g., as represented by blocks 82, 82a), to permit the memory controller to operate with different types of memory storage devices. In particular, based upon the value stored in memory type register 92, an enable signal is supplied to one of blocks 82, 82a to enable the operation of the state machine. Furthermore, the enable signal is transmitted to multiplexer 84 as a selector signal to couple memory I/O signals 80 with one of blocks 82, 82a. It should be appreciated that, in the alternative, more than two memory device types may be supported, or only one such device type may be supported, whereby register 92, multiplexer 84, and additional block 82a would not be required.

To adequately tune the performance of memory controller 78 to operate with various memory storage devices having different parameters, memory parameters register 94 is initialized with one or more delay counts corresponding to various timing parameters for which it is desirable for the controller to meet. Such delay counts are provided to each of blocks 82, 82a to configure the state machines to operate in accordance with the timing parameters represented by the delay counts in the register.

Figure 7:
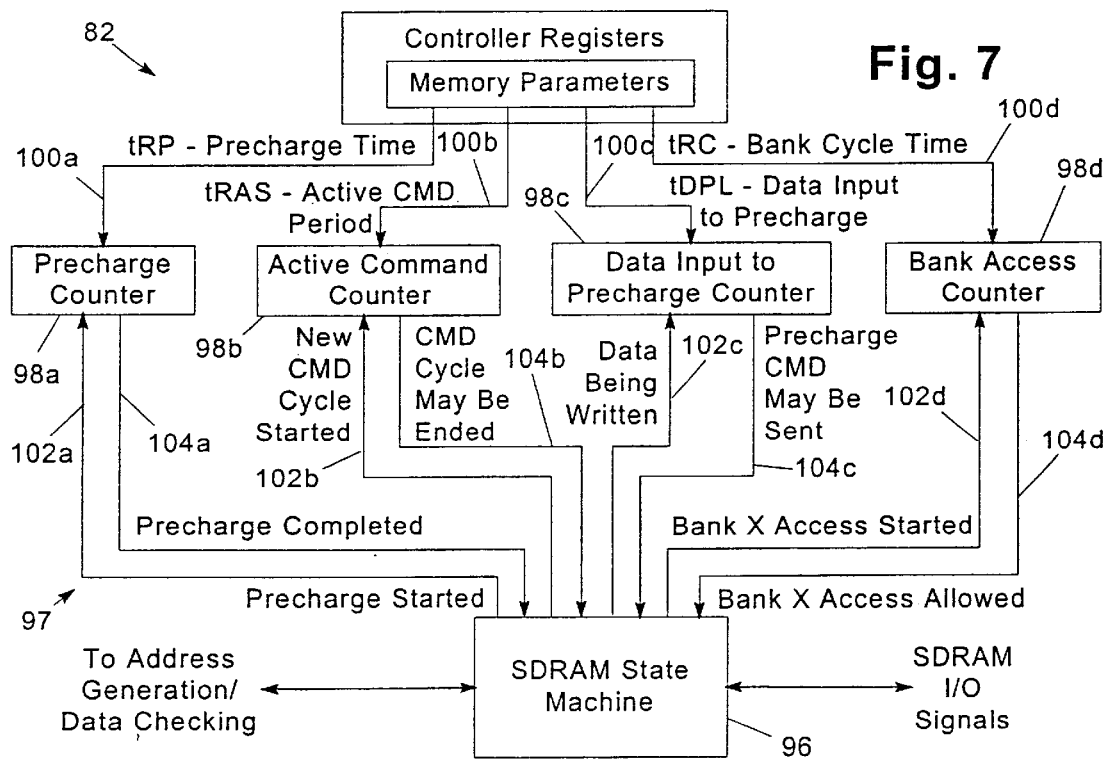
FIG. 7 is a block diagram of the memory-specific state machine/support logic block in the memory controller of FIG. 6.

As best shown in FIG. 7, for example, block 82 includes a Synchronous DRAM-specific state machine 96 which passes I/O signals between Synchronous DRAM memory storage devices and address generation/data checking block 88 of FIG. 6.

A tuning circuit 97 tunes the performance of state machine 96 to better operate with different Synchronous DRAM memory storage devices by tailoring the delays between certain memory control operations to meet several different timing characteristics relevant to Synchronous DRAM devices.

A first such timing characteristic is the precharge time ($t_{RP}$), which represents the minimum time required to precharge a bank on a particular Synchronous DRAM device prior to initiating a new command on the device. In this instance, the first memory control operation is the initiation of a precharge operation, and the second memory control operation is the issuance of a new command. The delay between such operations is controlled by a precharge counter 98a, which is programmed via a delay count supplied via a precharge time line 100a from memory parameters register 94. Counter 98a is started in response to a delay signal issued by state machine 96 over a precharge started line 102a. In turn, the counter returns an enable signal to state machine 96 over a precharge completed line 104a, after cycling the number of cycles specified by the delay count provided over line 100a.

A second timing characteristic is the active command period ($t_{RAS}$), which represents the minimum time required to process a command on a particular Synchronous DRAM device prior to initiating a precharge in anticipation of a next command on the device. In this instance, the first memory control operation is the start of a command cycle on a particular memory bank, and the second memory control operation is the initiation of a precharge operation on the bank. The delay between such operations is controlled by an active command counter 98b, which is programmed via a delay count supplied via an active command period line 100b from memory parameters register 94. Counter 98b is started in response to a delay signal issued by state machine 96 over a new command cycle started line 102b. The counter returns an enable signal to state machine 96 over a command cycle may be ended line 104b, after cycling the number of cycles specified by the delay count provided over line 100b.

A third timing characteristic is the data input to precharge ($t_{DPL}$), which represents the minimum delay that must occur after data is written to the device before a precharge operation may be initiated in anticipation of a next command on the device. In this instance, the first memory control operation is the completion of data being written to a particular bank on the device, and the second memory control operation is the initiation of a precharge operation on the bank. The delay between such operations is controlled by a data input to precharge counter 98c, which is programmed via a delay count supplied via a data input to precharge line 100c from memory parameters register 94. Counter 98c is started in response to a delay signal issued by state machine 96 over a data being written line 102c. The counter returns an enable signal to state machine 96 over a precharge command may be sent line 104c, after cycling the number of cycles specified by the delay count provided over line 100c.

A fourth timing characteristic is the bank cycle time ($t_{RC}$), which represents the minimum delay that must occur between activating successive commands on a particular bank of the device. In this instance, the first memory control operation is the activation of a first command on a particular bank on the device, and the second memory control operation is the activation of a second command on the same bank of the device. The delay between such operations is controlled by a bank access counter 98d, which is programmed via a delay count supplied via a bank cycle time line 100d from memory parameters register 94. Counter 98d is started in response to a delay signal issued by state machine 96 over a bank X access started line 102d. The counter returns an enable signal to state machine 96 over a bank X access started line 104d, after cycling the number of cycles specified by the delay count provided over line 100d.

It should be appreciated that other timing characteristics may also be controlled via additional counters in the manner discussed herein, which will typically be dictated by the particular design of the various memory storage devices for which it is desirable to interface with the memory controller. For example, FIG. 7 illustrates the counters suitable for tuning the performance of a single bank of a memory storage device. However, many if not all Synchronous DRAM devices are implemented as multi-bank devices, permitting accesses to different banks to be interleaved to improve the overall performance of such devices. As such, additional counters suitable to tune the performance of the memory controller for such other banks may be utilized, but are not shown. Specifically, it should be appreciated that each bank typically would require separate $t_{RC}$ counters. Application of the principles of the invention to tune the performance of such additional banks is within the abilities of one of ordinary skill in the art having the benefit of the disclosure presented herein.

In each instance, the delay count for a particular timing characteristic would be selected as the minimum number of clock cycles for the memory controller that equals or exceeds the timing parameter for the particular memory storage device for which the memory controller is tuned. Thus, for example, if one particular memory storage device had a timing parameter of 68 ns, while another particular memory storage device had a timing parameter of 37.5 ns, with a memory controller running with a 7.5 ns clock cycle, an optimum delay count for the former device would be 10, while the optimum delay count for the latter device would be 5.

Figure 8:
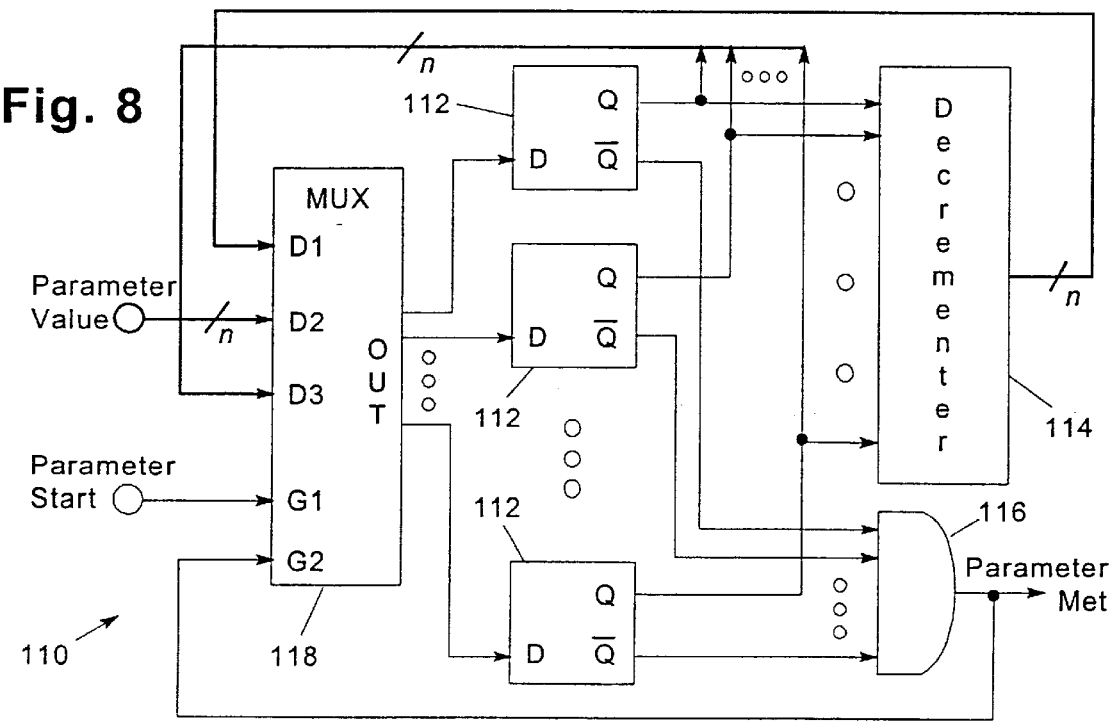
FIG. 8 is a block diagram of a decrement-type programmable delay counter suitable for use in the memory-specific state machine/support logic block of FIG. 7.

Each of counters 98a–d may be implemented using either a decrement-type counter or an increment-type counter, as discussed previously. FIG. 8 illustrates, for example, one suitable implementation of a decrement-type counter 110. Counter 110 includes 1 . . . n 1-bit latches 112, where n is the number of bits necessary to store the maximum delay count of that particular counter. For example, a 4-bit counter would be sufficient to provide up to a 16-cycle delay, which is suitable for handling a significant majority of timing parameters for most memory storage devices.

The active-high (Q) output of each latch 112 is provided to a decrementer block 114, which outputs in response thereto an n-bit wide signal representing one less than the count stored in latches 112. This decremented signal is supplied to a first data input (D1) of a multiplexer 118. Multiplexer 118 has an n-bit output, with each bit thereof supplied to the data (D) input of one of latches 112.

A second input (D2) to multiplexer 118 is coupled to receive an n-bit parameter value, or delay count, from the appropriate bits of the memory parameters register. In addition, the active-high (Q) output of each latch 112 is also provided at a third data input (D3) for multiplexer 118.

The active-low ($\overline{Q}$) outputs of latches 112 are logically AND'ed together via an n-bit AND gate 116, which outputs the enable signal (designated here as "parameter met") when the active-high (Q) outputs of all of latches 112 are zero (indicating a zero count for the counter).

Multiplexer 118 is gated by two gate signals G1 and G2. First gate signal G1 receives the delay signal from the state machine (designated here as "parameter start"). The second gate signal G2 receives the enable signal output by AND gate 116. Which of the three data inputs D1–D3 is coupled to the output of multiplexer 118 is determined by the states of signals G1 and G2 as defined below in Table I:

TABLE I

Multiplexer Output Table

| G1 | G2 | OUT |
|----|----|----|
| 1 | X | D2 |
| 0 | 0 | D1 |
| 0 | 1 | D3 |

Based upon the above-described configuration, it may be seen that, in response to assertion of gate signal G1, the delay count supplied at input D2 is output by multiplexer 118 to the various latches 112, in turn resulting in the active-high (Q) output thereof being supplied to decrementer 114. During the next clock cycle, when the delay signal has been deasserted, the output of decrementer 114 is passed to the output of multiplexer 118 to decrement the count stored in latches 112 for each clock cycle thereafter until such time as latches 112 store a count of zero. At this time, the enable signal is asserted by AND gate 116, thereby asserting the second gate signal G2, which has the effect of stalling the counter with a value of zero until such time as the counter is restarted via assertion of the delay signal.

Figure 9:
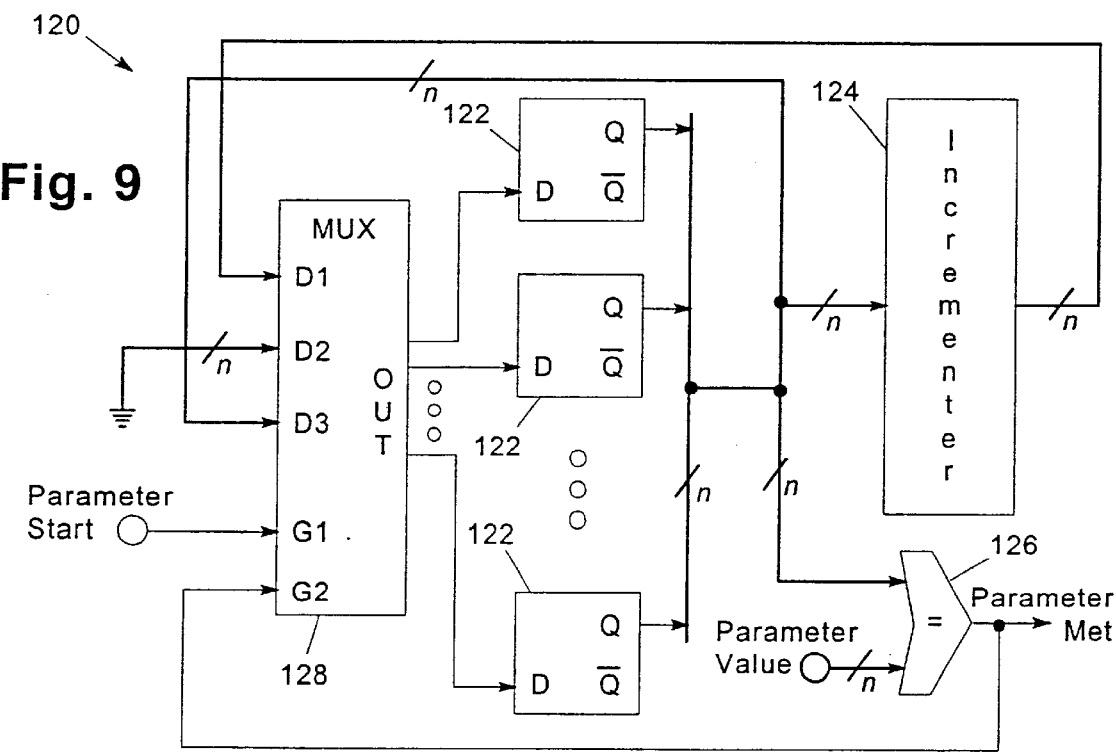
FIG. 9 is a block diagram of an increment-type programmable delay counter suitable for use in the memory-specific state machine/support logic block of FIG. 7.

A suitable implementation of an increment-type counter is illustrated at 120 in FIG. 9. In this implementation, the active-high (Q) outputs of 1 . . . n latches 122 are supplied to an incrementer 124, a comparator 126, and a third data input D3 of a multiplexer 128. The output of incrementer 124 is one plus the current count stored in latches 122, which is supplied to the first data input D1 of multiplexer 128. The second data input D2 of multiplexer 128 is grounded to provided an initial count of zero for the counter.

The output of multiplexer 128 is coupled to the data (D) inputs of latches 122. The first gate input G1 of multiplexer 128 is coupled to the delay signal output by the state machine (designated here as "parameter start"). The second gate input G2 is coupled to receive the output of comparator block 126. The same multiplexer output logic as described above with reference to Table I is also used in this implementation.

In operation, upon assertion of the delay signal from the state machine, the initial zero count applied to data input D2 is output to latches 122 to initialize the counter at zero. Then, upon deassertion of the delay signal, the incremented counter value output from incrementer 124 is passed by multiplexer 128 to latches 122. For each such clock cycle thereafter, the current count stored in latches 122 is compared to the parameter value output by the memory parameters register in comparator block 126. The counter is thus incremented each clock cycle until the current count equals the desired delay count. At such time, the enable signal is asserted by comparator block 126, and the counter is stalled by assertion of the second gate input G2 of multiplexer 128.

It should be appreciated that alternate counter implementations may be utilized to delay assertion of the enable signal the desired number of clock cycles after assertion of the delay signal. Thus, the invention should not be limited to the particular implementations discussed herein.

Figure 10:
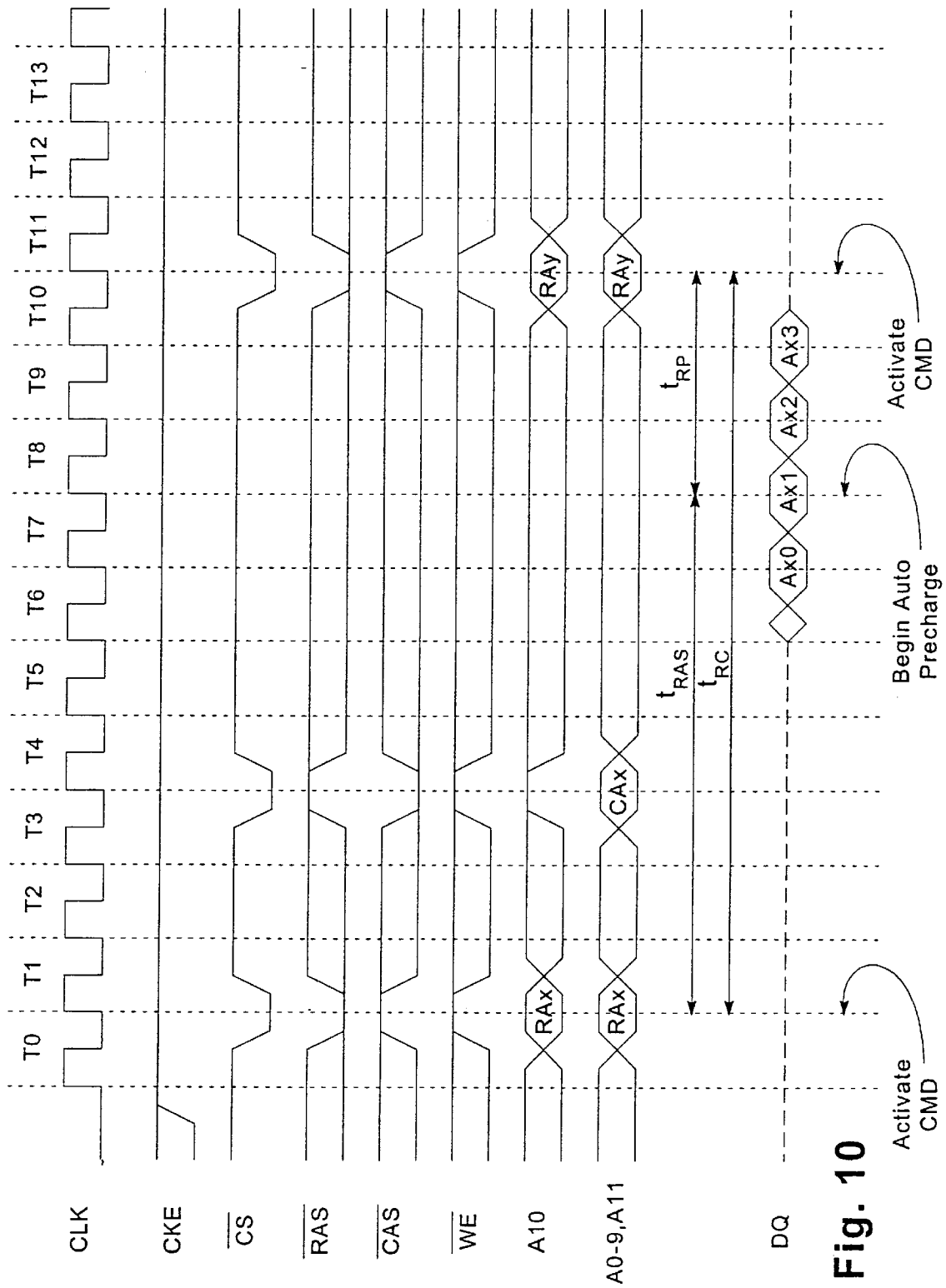
FIG. 10 is a timing diagram illustrating an exemplary timing of memory control operations during a read access using a memory controller consistent with the invention, for use with a memory storage device having a first set of timing parameters.
Figure 11:
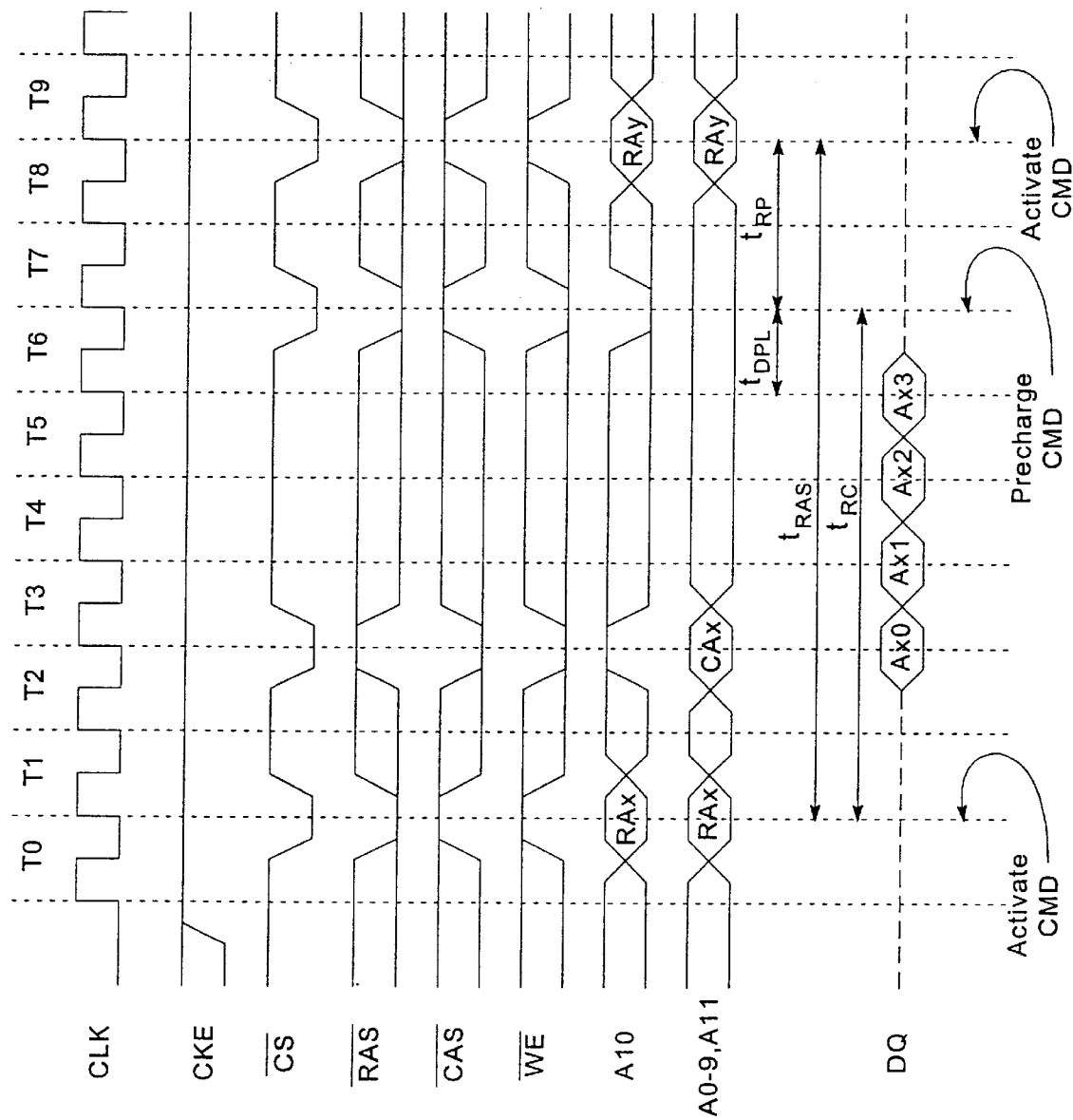
FIG. 11 is a timing diagram illustrating an exemplary timing of memory control operations during a write access using the memory controller consistent with the invention, for use with a memory storage device having a second set of timing parameters.

FIGS. 10 and 11 respectively illustrate suitable timing diagrams for READ and WRITE accesses to hypothetical first and second Synchronous DRAM memory storage devices, respectively. For the READ access, the first Synchronous DRAM is illustrated in FIG. 10 as having a burst length timing parameter of 4, a column address strobe ($\overline{CAS}$) latency of 3-cycles, and a $\overline{RAS}$ to $\overline{CAS}$ delay time ($t_{RCD}$) of 3-cycles. Various control signals relevant to handling a READ access with the first memory storage device are illustrated in FIG. 10, including a clock signal (CLK) a clock enable signal (CKE), an active-low chip select signal ($\overline{CS}$), an active-low row address strobe signal ($\overline{RAS}$), an active-low column address strobe signal ($\overline{CAS}$), an active-low write enable signal ($\overline{WE}$), a 12-bit address signal A0–A11 (with address line A10 illustrated separately), and a data output line (DQ). Represented cycles of the clock signal are labeled as T0–T13.

As shown in FIG. 10, a read access begins in cycle T1 after assertion of the clock enable signal in cycle T0. At this time, the $\overline{CS}$ and $\overline{RAS}$ lines are asserted and the $\overline{CAS}$ and $\overline{WE}$ lines are deasserted. Moreover, the row address (RAx) is supplied on the address lines. With a $\overline{CAS}$ latency of three cycles, therefore, in clock cycle T4, the column address is supplied to the device, the $\overline{CS}$ and $\overline{CAS}$ signals are asserted, the $\overline{RAS}$ and $\overline{WE}$ signals are deasserted, and the column address is supplied on address lines A0–9 and A11. In this particular implementation, address line A10 is asserted to indicate an auto-precharge command. With the $\overline{CAS}$ latency of three cycles, the requested data is supplied over data lines DQ starting at cycle T7. Further, with a burst length of 4, therefore, the data stored at four successive addresses (designated Ax0, Ax1, Ax2 and Ax3) is supplied in the four subsequent cycles.

For the particular memory storage device represented in FIG. 10, the precharge time ($t_{RP}$) is about 20.4 ns. The optimum controller delay to meet this parameter is represented in FIG. 10 as the time period between the auto-precharge at clock cycle T8 and the next activate command begun at clock cycle T11.

The active command period ($t_{RAS}$) for the memory storage device represented by FIG. 10 is about 47.6 ns. The optimum controller delay to meet this parameter is represented in FIG. 10 as the time period between the activate command begun at clock cycle T1 and the beginning of the precharge occurring at cycle T8. In addition, the bank cycle time ($t_{RC}$) for the memory storage device is about 68 ns, with the optimum controller delay therefor represented as the time period between the two successive activate commands at clock cycles T1 and T11, respectively. Also, for this device, a data input to precharge time parameter ($t_{DPL}$) is about 8 ns, but is not shown in FIG. 10 as it is relevant only for a write access.

It is assumed for the purpose of this example that a memory controller consistent with the invention is configured to vary the four parameters discussed above with respect to FIG. 7, namely $t_{RP}$, $t_{RAS}$, $t_{RC}$ and $t_{DPL}$, as well as two additional parameters, the $\overline{CAS}$ latency and $t_{RCD}$. Assuming a memory controller clock cycle time of about 7.5 ns, therefore, the memory controller would optimally be configured with the delay counts specified in Table II below:

TABLE II

FIG. 10 Delay Counts

| Characteristic | Parameter | Delay Count |
|---|---|---|
| $t_{RP}$ | 20.4 ns | 3 |
| $t_{RAS}$ | 47.6 ns | 7 |
| $t_{RC}$ | 68 ns | 10 |
| $t_{PL}$ | 8 ns | 2 |
| $\overline{CAS}$ Latency | 3 cycles | 3 |
| $t_{RCD}$ | 3 cycles | 3 |

To simplify the illustration, only the signal operations occurring with respect to a single bank of the memory storage device are illustrated in FIG. 10. It should be appreciated that another bank of the device may be accessed during the time period between the two activate commands. For example, to access another bank, the row and column addresses for the alternate bank could be supplied at clock cycles T6 and T9 to kick off an access request while data is being output to the first bank.

FIG. 11 illustrates the timing of the control signals for another memory storage device suitable for use with the same memory controller, this time during a write access. With this memory storage device, the $\overline{CAS}$ latency and $t_{RCD}$ are each two cycles. Moreover, the precharge time of this device is about 15 ns, and the active command period $t_{RAS}$ is about 40 ns. Moreover, the bank cycle time is reduced to about 55 ns. Additionally shown in this figure is a representation of the data input to precharge $t_{DPL}$, which for this device is about 6 ns. Thus, the delay between the final data being written during the write operation initiated at clock cycle T1, to the initiation of the precharge of the next active command, is represented as occurring between the start of clock cycle T6 and the start of the precharge performed in clock cycle T7.

To optimize the same exemplary memory controller described above with reference to FIG. 10, therefore, the optimal delay counts specified below in Table III would be used:

TABLE III

FIG. 11 Delay Counts

| Characteristic | Parameter | Delay Count |
|---|---|---|
| $t_{RP}$ | 15 ns | 2 |
| $t_{RAS}$ | 40 ns | 6 |
| $t_{RC}$ | 55 ns | 8 |
| $t_{DPL}$ | 6 ns | 1 |
| $\overline{CAS}$ Latency | 2 cycles | 2 |
| $t_{RCD}$ | 2 cycles | 2 |

It should be appreciated that the configuration of a suitable state machine to handle the timing of the above-described memory I/O signals to initiate the read/write data transfer in a format suitable for the particular memory storage devices coupled to the controller would be well within the ability of one of ordinary skill in the art.

Dynamic Tuning

As discussed above, it may also be desirable to permit the timing parameters for a memory controller to be tuned dynamically—that is, determined during operation of the memory controller. Dynamic tuning consistent with the invention has a number of useful applications. For example, a memory controller may be used with different memory storage devices without the designer, developer manufacturer and/or user having to specifically configure the memory controller for any particular memory storage devices. Dynamic tuning therefore might permit memory storage devices to be swapped out of an existing system without the need for any manual reconfiguration of the system. Also, a manufacturer may be able to assemble an electronic system with different memory storage devices without having to specifically configure the system based upon which devices were used.

Further, when it is anticipated that the performance of memory storage devices may improve over the course of the product life of a given memory controller design, the same design may be able to be incorporated into more products, and over a longer time period, thus reducing development costs when memory storage device performance increases. Moreover, dynamic tuning may be useful in systems where the memory storage devices to be used are determined by market conditions, and vary considerably over the course of a product cycle, particularly when any device drivers written to utilize a memory subsystem need to be written in a manner that is independent of the installed or supplied memory storage devices. In addition, in testing environments, it may be desirable to utilize dynamic tuning to test a memory storage device to determine how close to specified or recommended limits the device can operate.

Also, dynamic tuning may also be useful in a number of additional circumstances where it may be desirable to permit the controller to operate memory storage devices with timing parameters that are outside the recommended operating ranges specified by a manufacturer. For example, it may be desirable to use dynamic tuning to optimize experimental computer or other electronic systems for maximum performance when performance is more important than reliability. Users that customize standard computer systems, e.g., by overclocking a microprocessor, could also use dynamic tuning to maximize the performance of standard memory storage devices in a customized environment.

Still another application of dynamic tuning is in permitting a memory controller to operate with non-conforming memory storage devices. Thus, for example, if a particular memory storage device is faulty and is not capable of meeting its listed specifications, dynamic tuning may permit a memory controller to in effect be slowed down to operate with the memory storage device, thus preventing faulty operation, albeit with reduced performance.

Figure 12:
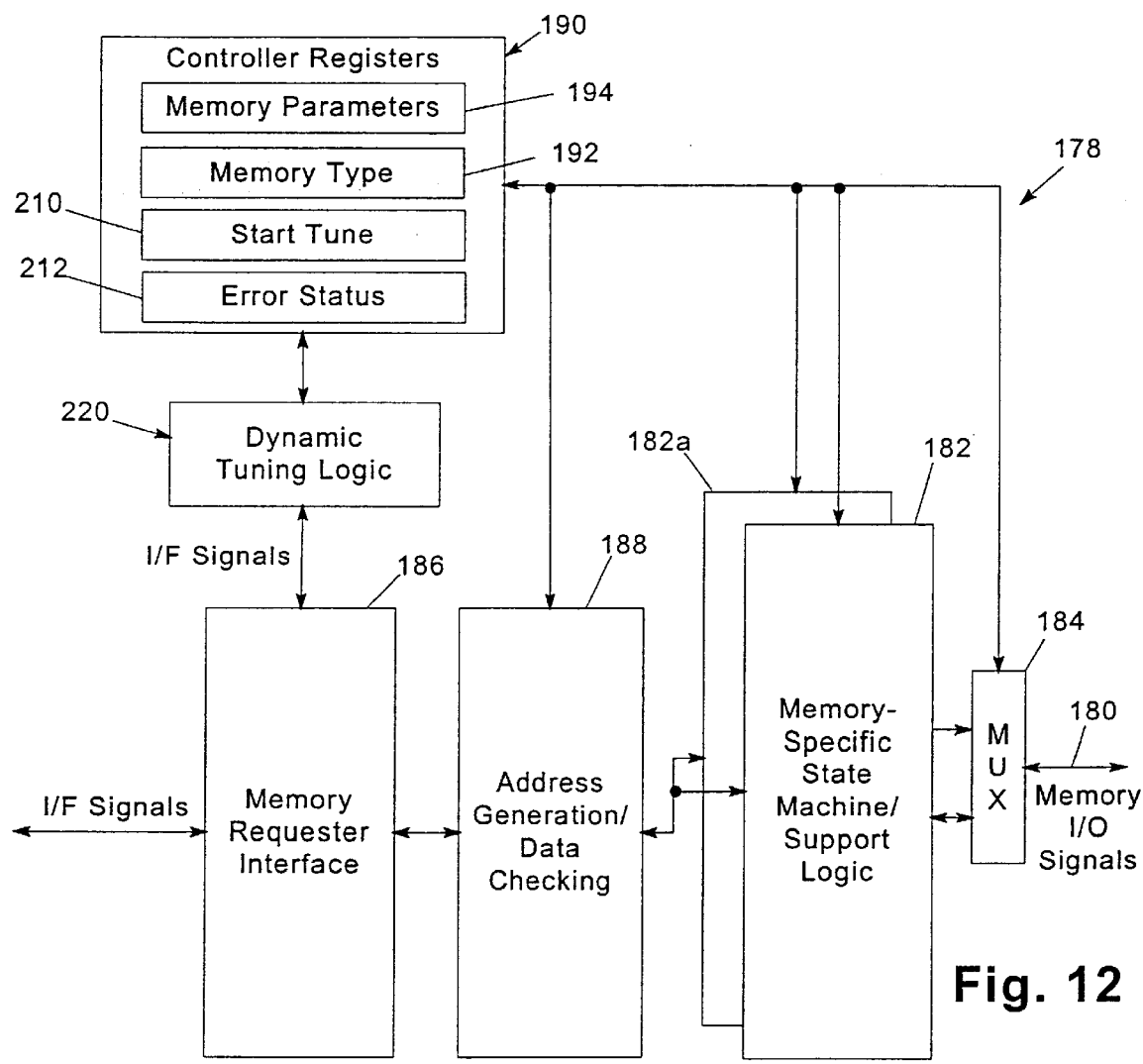
FIG. 12 is a block diagram of a dynamically-tunable implementation of the memory controller in the network adapter of FIG. 5.

A memory controller that incorporates dynamic tuning consistent with the invention is illustrated at 178 in FIG. 12. It is anticipated that memory controller 178 may be used in any environment described above for memory controller 78 of FIG. 6, including for example within network adaptor 62 of data processing system 40 (FIGS. 4 and 5). As with memory controller 78, memory controller 178 includes one or more memory-specific state machine/support logic blocks 182, 182a that are coupled to memory I/O signals 180 via a multiplexer 184. A memory requester interface 186 is configured to receive control signals from one or more external memory requesters, as well as an additional set of control signals from a dynamic tuning logic block 220 that implements dynamic tuning consistent with the invention. Block 186 is interfaced with an address generation/data checking block 188, which is in turn coupled to blocks 182, 182a.

Memory controller 178 also includes a bank of controller registers 190, including a memory type register 192 and a memory parameters register 194, which are configured in a similar manner to registers 92 and 94 of memory controller 78 discussed above. Specifically, memory parameters register 194 maintains one or more delay counts corresponding to various timing parameters for which it is desirable for the controller to meet. Such delay counts are provided to each of blocks 182, 182a to configure the state machines to operate in accordance with the timing parameters represented by the delay counts in the register. The reader is directed to the descriptive material above with respect to FIGS. 1–11 for a more detailed discussion of the use of the delay counts stored in register 194 to control programmable delay counters consistent with the invention.

While the dynamic tuning feature is discussed hereinafter as being used in conjunction with programmable delay counters that controllably vary the delay between memory control operations, it should be appreciated that this aspect of the invention is not specifically limited to use in connection with such counters. Any alternate manners of varying the delay between memory control operations, including the use of multiple paths of execution and/or wait states, may be used in connection with dynamic tuning consistent with the invention.

Controller register bank 190 also includes two additional enumerated registers, start tune register 210 and error status register 212. Start tune register 210 is used to provide a Start signal to the dynamic tuning logic block to initiate a dynamic tuning operation. The register may be controlled, for example, by a memory-specific state machine/support logic block 182, 182a to permit dynamic tuning to be performed during startup or initialization of the memory controller and/or during the normal operation of the memory controller. In the alternative, a start signal may be hardwired in logic such that dynamic tuning is initiated solely upon power up of the memory controller, whereby register 210 would not be required. It will be appreciated that dynamic tuning can be performed at any time during operation of a memory controller as desired.

Error status register 212 provides an indication of any errors encountered by the memory controller in operation, and may be written to and/or read from by both dynamic tuning logic block 220 and any of blocks 182, 182a. As will be discussed in greater detail below, at least a portion of such error information stored in register 212 is generated by dynamic tuning logic block 220 when dynamically testing memory storage devices to determine whether the devices are capable of operating in a reliable and error-free manner using different memory parameter values being tested by the dynamic tuning logic. Other error information used by other components of memory controller 178 may also be stored in register 212.

Figure 13:
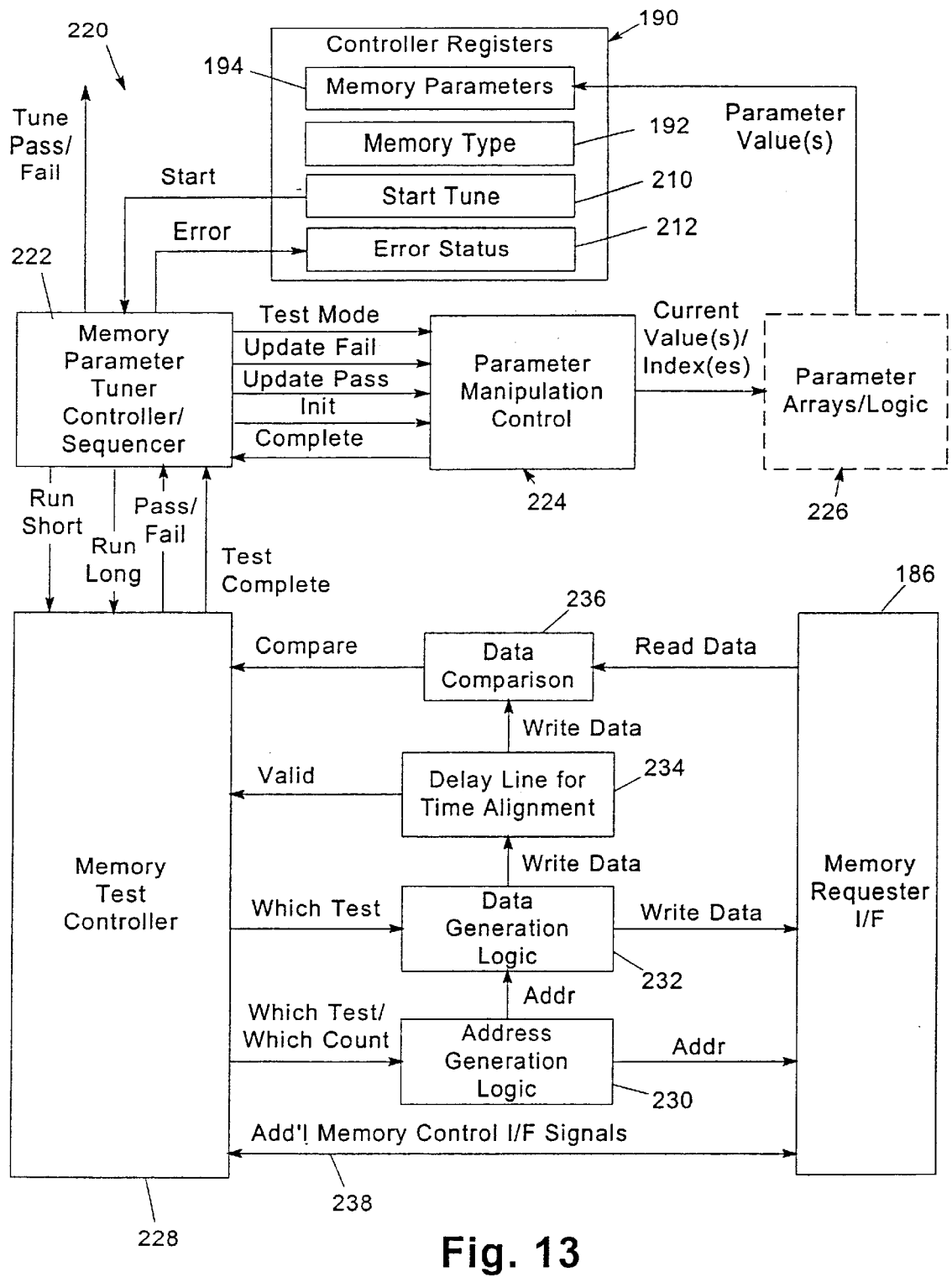
FIG. 13 is a block diagram of the dynamic tuning logic of FIG. 12, shown interfaced with controller registers and a memory requester interface.

FIG. 13 illustrates one suitable implementation of dynamic tuning logic block 220 in greater detail, shown interfaced with controller registers 190 and memory requester interface 186 of memory controller 178. Dynamic tuning logic block 220 is principally controlled by a memory parameter tuner controller/sequencer 222 implemented as a state machine to coordinate the activities of the other components in block 220. Controller/sequencer 222 manipulates one or more parameters stored in memory parameters register 194 using at least one parameter manipulation control block 224.

The output of block 224 may be one or more current values to be stored in register 194 as the operational memory parameter(s) with which to operate memory controller 178. In the alternative, as represented by optional parameter arrays/logic block 226, the output(s) of block 224 may operate as index(es) into one or more arrays of permissible memory parameter values, such that block 226 outputs parameter values to be stored in register 194.

Controller/sequencer 222 also controls a memory test controller 228 that is used to test the operation of the memory storage devices coupled to the memory controller and thus provide feedback as to the acceptability of various memory parameter values being tested by the dynamic tuning logic. Memory test controller 228 is interfaced with memory requester interface block 186 to permit the test controller to drive the memory storage devices in much the same manner as any other memory controller, in a manner that is well known in the art. Test controller 228 performs a memory test in any number of known conventional manners, principally by writing specific data into one or more addresses, and then reading back the contents of the addresses to verify that the read data matches that originally written.

Memory test controller 228 is interfaced with block 186 via several logic blocks 230–236 to permit the results of memory operations performed by the test controller to be verified. In addition, as shown at 238, other memory control interface signals may be received by and/or driven by test controller 228, based upon the particular interface requirements for the memory storage devices being tested.

An address generation logic block 230 drives the address lines to the memory storage devices in response to which test and which count signals from the test controller. The which test signal is typically an encoded signal that selects among different available tests, and the which count signal is typically used to cycle through a burst-type memory test. The address output by block 230 is also provided to a data generation logic block 232, which determines, in response to both the address output thereto and the test currently being run (indicated by the which test signal from the memory test controller), the specific data that should be written to the memory at that address. The data value to be written is provided as write data both to interface block 186 and a delay line block 234. Block 234 simulates the expected delay for the memory storage device completing the current operation and provides the write data at such delayed time to a data comparison block 236 so that the write data generated by block 232 can be compared to the read data being returned by interface block 186. Block 234 also provides a valid signal to test controller 228 to indicate when write data has been delayed an appropriate time and is now valid, so that the test controller can initiate a read operation to verify the results of a test write operation.

Based upon whether the read data matches the write data, a compare signal is returned by block 236 to test controller 228 to indicate that read data returned from the memory storage device is or is not the same as the data originally written by the test controller. Upon completion of a requested memory test, test controller 228 returns a test complete signal to controller/sequencer 222, along with a pass/fail signal indicating whether the memory test was successful.

Controller/sequencer 222 is typically implemented as a state machine that receives input signals, asserts output signals, and proceeds between various states to implement a sequence of operations. FIG. 4 illustrates at 250 one suitable basic program flow that may be implemented in controller/sequencer 222 to perform dynamic tuning consistent with the invention. Typically, the program flow is initiated in response to assertion of the Start signal from register 210 (FIG. 4). First, parameters are initialized as represented at block 252. Such initialization may take the form, for example, of selecting the most conservative values of each programmable parameter. Next, as shown in block 254, a memory test is performed to determine whether the current parameter values provide an optimal configuration for the controller. As shown in block 256, test closure is evaluated, whereby if the current parameter values do not provide the optimal configuration (e.g., if errors are detected, or if more ambitious values still need to be tested), the tuning operation continues, and the parameters are updated with new values (block 258). The new values are then tested (block 254), and the loop represented by blocks 254–258 is performed until an optimal setting has been reached. Once such a setting is obtained, the dynamic tuning operation is complete.

As far as performing a memory test on a set of parameters, controller/sequencer 222 of FIG. 13 may be configured to initiate any number of memory tests with memory test controller 228. Specifically, in the illustrated embodiment, it is desirable to use a progressive memory testing algorithm to minimize overall testing time. The progressive memory testing algorithm first runs one or more memory tests that will quickly return results when one or more parameters will not support the operation of a memory storage device. Later tests are then run to distinguish more subtle differences in parameter settings, e.g., where particular settings may cause intermittent errors and/or are "on the bubble" of acceptable ranges of values for particular parameters. If the later, more fine grain tests pass, then there is a high probability that the memory storage devices will work long term with the current parameter settings. In addition, in the illustrated embodiment, it may also be desirable to include operation testing, e.g., specialized read-modify-write sequences, advantageous block switching, or hidden refreshes, among others. Moreover, it may be desirable to make the tests independent of line size, and make a large default assumption of row size for the purposes of refresh evaluation.

Furthermore, if error detection or error correction is included as part of the memory controller, such facility can be used as part of the test, with a single bit error indicating a failure, if repeatable. If error detection is not part of the memory controller, then data being written may include an ECC code generated by an appropriate ECC generating function, as is known in the art. Moreover, without error detection, it is desirable to utilize a suitable pseudo-random generator for generating any pseudo-random patterns that does not repeat on boundaries of powers of two, which might otherwise mask potential address line errors).

As an example of one suitable testing algorithm, in the illustrated embodiment, the various tests to be performed are grouped into two test groups, a "short" test and a "long" test, as represented by the "run short" and "run long" signals from controller/sequencer 222 to test controller 228. One suitable short test that may be implemented by memory test controller 228 may include the following sequence of operations:

1. write a single location to all 0's and read it back;
2. write a single location to all 1's and read it back; and
3. write a pseudo-random pattern to a single location and read it back.

One suitable long test that may be implemented by memory test controller 228 may include the following sequence of operations:

1. write a short burst of locations to all 0's, 1's, and/or pseudo-random patterns and read back;
2. write a long burst of locations to all 0's, 1's, and/or pseudo-random patterns and read back;
3. write an ascending long burst of locations crossing row boundaries to all 0's, all 1's and/or pseudo-random patterns and read back;
4. write a descending long burst of locations crossing row boundaries to all 0's, all 1's and/or pseudo-random patterns and read back; and
5. perform either or both of long tests 3 and 4 with the reads and writes four-way interleaved.

It should be appreciated that the long test will only be initiated by controller/sequencer 222 if the short test results in a "pass" result from memory test controller 228. Consequently, if the short test results in a "fail" result, the additional time required to perform the long test is avoided for that set of parameters.

It should be appreciated that the implementation of the tests identified above in memory test controller 228 is within the skill of the ordinary artisan having the benefit of the instant disclosure. Moreover, a vast number of alternative testing algorithms are also known in the art, and may be used in connection with and/or as an alternative to the testing algorithms described herein. Further, other combinations of individual tests may be grouped to define the various levels of a progressive test. Thus, the invention is not limited to the specific testing algorithm discussed herein.

Returning to FIG. 14, the update parameters operation in block 258 may utilize a number of algorithms consistent with the invention. Furthermore, returning to FIG. 13, controller/sequencer 222 may be configured to determine optimal values for any number of memory parameters. For example, when more than one memory parameter is being controlled, the optimal values therefor may be determined either independently or jointly as desired.

In the case of independent determination of parameter values, parameters are typically adjusted to optimum values one-by-one, then additional testing is performed with all parameters at optimum values to ensure that no errors occur due to combinations of parameters. With joint determination, however, parameter values for multiple parameters are typically grouped together in arrays and adjusted as a group through the use of an index into a two dimensional parameter array (discussed below). An array structure may also be used whenever a range of acceptable parameter values are not purely linear, whereby the index maps to different values forming a non-linear range of suitable parameter values.

Figure 15:
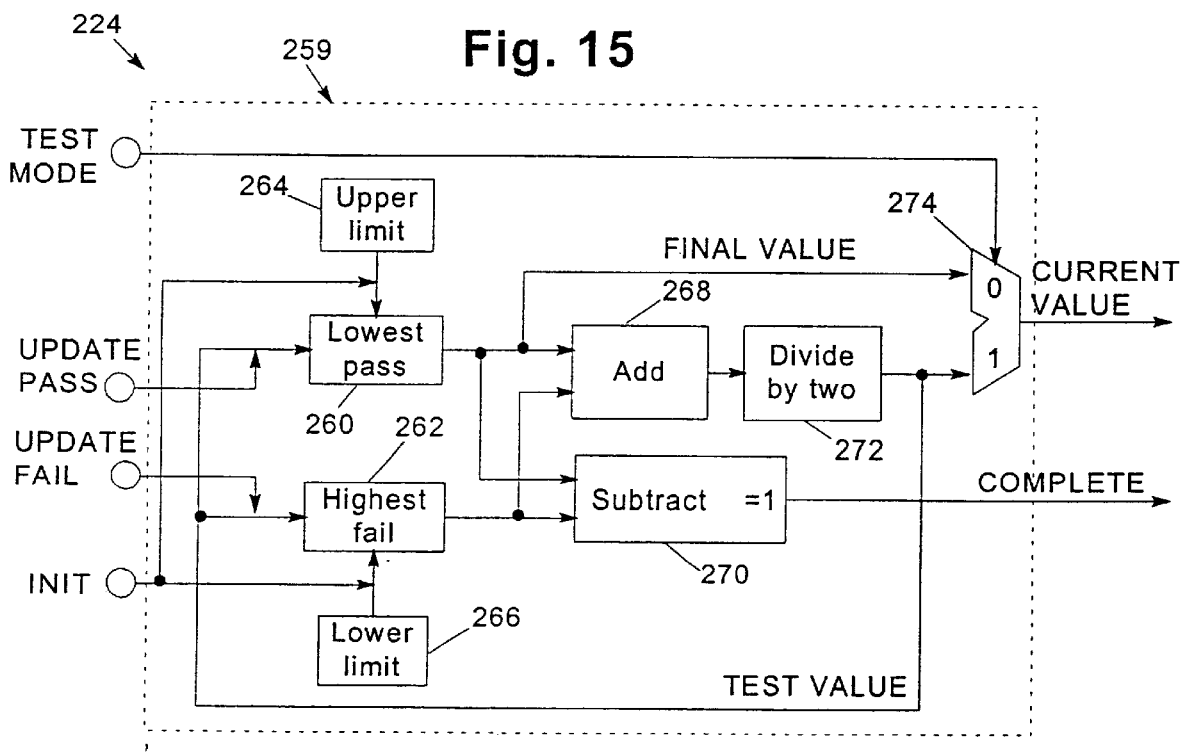
FIG. 15 is a block diagram of a parameter manipulation control block from the dynamic tuning logic of FIG. 13.

FIG. 15, for example, illustrates one suitable implementation of a parameter manipulation control block 224 that may be used to update either a single parameter or a group of parameters. Block 224 includes a binary search engine 259 that is used to select an optimum value based upon the results of a memory test performed after a parameter value has been updated.

Binary search engine 259 includes a pair of working registers 260, 262 operably coupled to a pair of constant registers 264, 266. Assuming that a "high" memory parameter value represents a more conservative value than a "low" memory parameter value, working register 260 is termed a lowest pass register that is used to store the lowest parameter value that results in a successful memory test, and working register 262 is termed a highest fail register that is used to store the highest parameter value that results in an unsuccessful memory test. In addition, constant registers 264 and 266 are respectively termed upper and lower limit registers that respectively store the highest and lowest values in the range of acceptable values for the particular parameter being optimized.

To start a binary search operation, an INIT signal is asserted by controller/sequencer 222 (FIG. 13), which loads the value stored in upper limit register 264 into lowest pass register 260, and loads the value stored in lower limit register 266 into highest fail register 262. Registers 264 and 266 may be programmable, or more likely are hardwired with known limits to the acceptable range of values for a given parameter. Assertion of the INIT signal by controller/sequencer 222 generally corresponds to block 252 of FIG. 14.

The outputs of registers 260, 262 are fed to both an adder circuit 268 and a subtractor circuit 270. The output of adder circuit 268 is fed to a divide by two circuit 272, which in the illustrated embodiment may be implemented by a one-bit right shift circuit to shift by one bit the binary representation of the value. Blocks 268 and 272 together implement an averaging circuit, thus outputting the average of the values stored in registers 260 and 262. As such, other averaging circuit implementations may be used in the alternative. The averaged value is output from block 272 as a TEST VALUE signal to one input of a multiplexer 274. The TEST VALUE signal is also fed back to each of registers 260, 262.

The other input of multiplexer 274 is tied to the output of register 260, and is termed a FINAL VALUE signal as it is this signal that represents the resulting optimum value determined by the engine. The output of the multiplexer is termed a CURRENT VALUE signal, and it is this value that is output from block 224. The selection input to multiplexer 274 is termed a TEST MODE signal that is selectively asserted by controller/sequencer 222 when in a test mode. Consequently, when in a test mode, the value of the TEST VALUE signal is provided as the CURRENT VALUE signal, and when in a non-test, or operational mode, the FINAL VALUE signal is provided as the CURRENT VALUE.

The TEST VALUE inputs to registers 260, 262 are respectively gated by UPDATE PASS and UPDATE FAIL signals selectively asserted by controller/sequencer 222. The UPDATE PASS signal is asserted whenever the last test initiated by controller/sequencer 222 resulted in a "pass" result from memory test controller 228. Similarly, the UPDATE FAIL signal is asserted whenever the last test initiated by controller/sequencer 222 resulted in a "fail" result from memory test controller 228. Assertion of one of the UPDATE PASS and UPDATE FAIL signals corresponds generally to block 258 of FIG. 14.

Consequently, whenever a test results in a "pass" result, register 260 is updated with the average of the values stored in registers 260 and 262. Likewise, whenever a test results in a "fail" result, register 262 is updated with the average of the values stored in registers 260 and 262. Moreover, once either register 260, 262 is updated, blocks 268 and 272 calculate a new average, which is subsequently output from block 224 as the CURRENT VALUE signal. Controller/sequencer 222 then performs another memory test with the new parameter value (corresponding to block 254 of FIG. 14), and the appropriate register 260, 262 is updated responsive to the result. In this manner, the values stored in registers 260 and 262 tend to converge to an optimal value.

Figure 14:
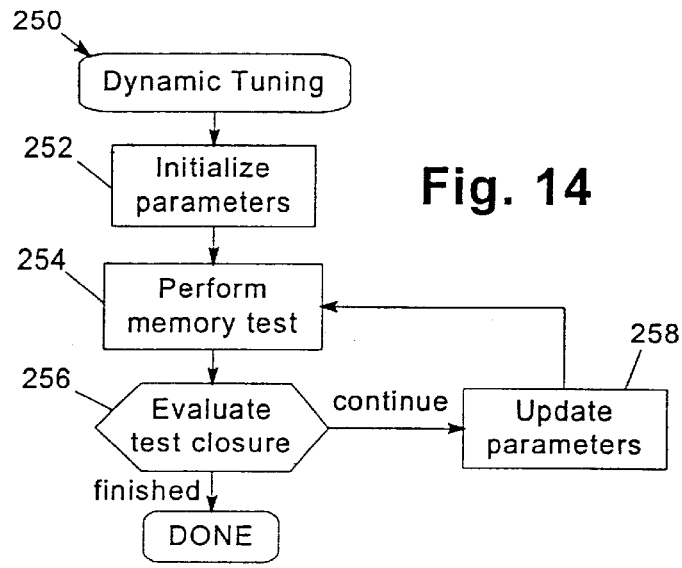
FIG. 14 is a flowchart illustrating a sequence of operations performed by the dynamic tuning logic of FIG. 13.

As mentioned above, registers 260, 262 also output to a subtractor circuit 270 to take the difference of the value in block 260 to that in block 262. Subtractor circuit 270 functions as a test closure circuit that determines when the test is complete, and thus, when an optimum value has been obtained. An output of the subtract block is a COMPLETE signal, which is asserted whenever the difference in the values in registers 260 and 262 is one. Once a difference of one is obtained, the registers have converged to an optimum value, which is stored in register 260. In response to assertion of the COMPLETE signal, controller/sequencer 222 can terminate the testing sequence for the current parameter, and deassert the TEST MODE signal to select the FINAL VALUE signal as the CURRENT VALUE for the parameter. Consequently, in the implementation of FIG. 15, a check of COMPLETE signal by controller/sequencer 222 corresponds generally to block 256 of FIG. 14, while the transition from this block to termination of the program flow of FIG. 14 is represented by the deassertion of the TEST MODE signal.

An alternate parameter manipulation control block 224' is illustrated in FIG. 16. Block 224' receives the same inputs, and provides the same outputs, as block 224. Moreover, block 224' includes lowest pass, highest fail, upper limit and lower limit registers 280–286, as well as adder, divide by two and subtractor blocks 288–292, which are generally arranged and configured in the same manner as corresponding registers 260–266 and blocks 268–272 of parameter manipulation control block 224 of FIG. 15. Unlike block 224, however, block 224' omits the use of a multiplexer, instead relying on a NAND gate 294 that supplies a CARRY signal as another input to adder block 288. NAND gate 294 receives as input the TEST MODE signal and the UPDATE PASS signal.

The CARRY signal is asserted whenever in the operational mode, or, if in the test mode, whenever the last memory test result was a fail. Upon completion, with the CARRY signal asserted, the CURRENT VALUE signal output by block 292 will be the same as the value stored in register 280, thereby eliminating the need for a separate multiplexer.

It may be seen that either of binary search engine implementation 259, 259' can be utilized in other applications than dynamic tuning of a memory controller. Specifically, in each such implementation, the values stored in the lowest pass and highest fail registers are taken from a monotonically-sorted list of values (i.e., a sorted list where successive values that are not equal either all increase or all decrease). Moreover, the memory test controller functions as a test circuit that compares the TEST VALUE output by the binary search engine according to a predetermined comparison criteria—here, whether the memory storage device passes the memory test.

However, it should be appreciated that a binary search engine as described herein may have other applications where it is desirable to quickly and easily find an optimal value in a monotonically-sorted list of values. As such different comparison criteria, and different test circuits implementing the same, may also be used consistent with the invention. Examples include, but are not limited to, choosing a boundary entry in a sorted list, selecting the best working set of memory parameters, selecting the location of the boundary of a failure, finding the best match in a color lookup table, or locating a network address in an ordered table.

Now returning to FIG. 13, the current value output by parameter manipulation control block 224 may be represent the actual delay count calculated for that parameter. In the alternative, as represented by optional block 226, the value output by block 224 may represent an index into one or more arrays of suitable values for one or more parameters. Thus, if the acceptable values for a parameter are non-linear, the values may be placed in an array indexed by a linear range of index values. For example, if the acceptable values for a parameter are 3, 4, 6, 8 and 11, the values may be placed into an array v(i), where v(1)=3, v(2)=4, v(3)=6, v(4)=8 and v(5)=11. The range of the index i would then be 1 to 5.

Moreover, as shown in FIG. 17, for example, block 226 may represent a two-dimensional array of parameter values, indexed by row by the CURRENT VALUE signal from block 224. In this configuration, the CURRENT VALUE signal may be used to jointly optimize a group of parameters at once (here four parameters P1–P4), where each column 295 of the array represents a range of acceptable values for one parameter. Furthermore, each range of acceptable values for a parameter may be linear or non-linear, as appropriate for that parameter.

As an example, it might be assumed that a particular memory controller design was suitable for use with a fixed number of different known memory storage devices having predetermined values for each controllable parameter. By placing in each row of the array a set of parameters optimized for a particular memory storage device, the CURRENT VALUE signal may be used to select between the different parameter sets to find the optimum settings.

While a two-dimensional array may be used to represent sets of parameter values, an array may take up a rather large area on an integrated circuit device, particularly due to redundant data in the array. Consequently, in some implementations it may be desirable to utilize an alternate structure such as parameter logic block 226' of FIG. 18, where hardwired logic, represented at block 297, is used instead of an array. In particular, it is known that any mapping of input values to output values can be arranged in a Karnaugh map and defined in terms of boolean logic, thus permitting the mapping to be implemented solely using logic gates. Implementation of an array in this manner is well within the ability of one of ordinary skill in the art.

Now turning to FIG. 19, another parameter manipulation control block 224" is shown, which is suitable for use in optimizing a plurality of parameters independent of one another. In this implementation, a plurality of binary search engines, represented at 259, are used, with each binary search engine 259 for use in determining an optimum value for one parameter, or for a subset of parameters. Other binary search engine designs (e.g., binary search engine 259' of FIG. 16, among others), may also be used in the alternative. Moreover, to conserve the space occupied by multiple binary search engines, it may be desirable to use reproduce the register set of the lowest pass register, highest fail register, upper limit register and lower limit register for each parameter, and permit each register set to share the same adder, divide by two, and subtractor blocks, with the control signals supplied to the shared blocks multiplexed by a parameter select signal.

Each binary search engine 259 outputs to a dedicated latch 302, which may form a component of parameter manipulation control block 224", or in the alternative, may represent the actual parameter storage in memory parameter register 194. Each latch 302 is configured to receive as input the CURRENT VALUE signal from its associated binary search engine 259, as well as the UPPER LIMIT signal output by the upper limit register therein. Furthermore, the current value stored in the latch, as well as the UPPER LIMIT signal, are provided to a dedicated averager block 304, which outputs the average of these values as a third input to the latch. Each averager block may be implemented, for example, using a combination of an adder block and divide by two block similar to each binary search engine.

A control demultiplexer 300 is coupled between the controller/sequencer and each binary search engine 259, thereby permitting the TEST MODE, UPDATE PASS, UPDATE FAIL and INIT signals from the controller/sequencer to be used for each binary search engine 259 (where only one such group of signals is shown coupled between demultiplexer 300 and one binary search engine 259, and between demultiplexer 300 and one latch 302). In the alternative, separate control signals may be provided from the controller/sequencer to each binary search engine. The COMPLETE signal from each binary search engine is also provided back to the controller/sequencer, either as a separate signal, or as a combined signal with the COMPLETE signal from each other binary search engine (e.g., through an OR gate).

In addition, the controller/sequencer is further configured to provide several additional control signals to block 224". A CURRPARAM signal is used as a select input to control demultiplexer 300 to select one of the available parameters and associated binary search engine 259 and latch 302 for control. Moreover, a LATCH signal, a LATCH SELECT signal, a DEC PARAM signal and a INC PARAM signal are provided to each latch 302 to provide additional control over the latches. The LATCH SELECT signal is used to select among the CURRENT VALUE signal, the UPPER LIMIT signal, and the averaged signal output from average block 304 for latching into the latch. The LATCH signal is used in connection with the LATCH SELECT to cause the latch to store the signal found at the selected input in the latch. The DEC PARAM and INC PARAM signals are respectively used to decrement and increment by one the value currently stored in the latch. The output of each latch is the current value for the associated parameter, which is used by the associated programmable delay counter to control the timing of memory operations by the memory controller.

Figure 20:
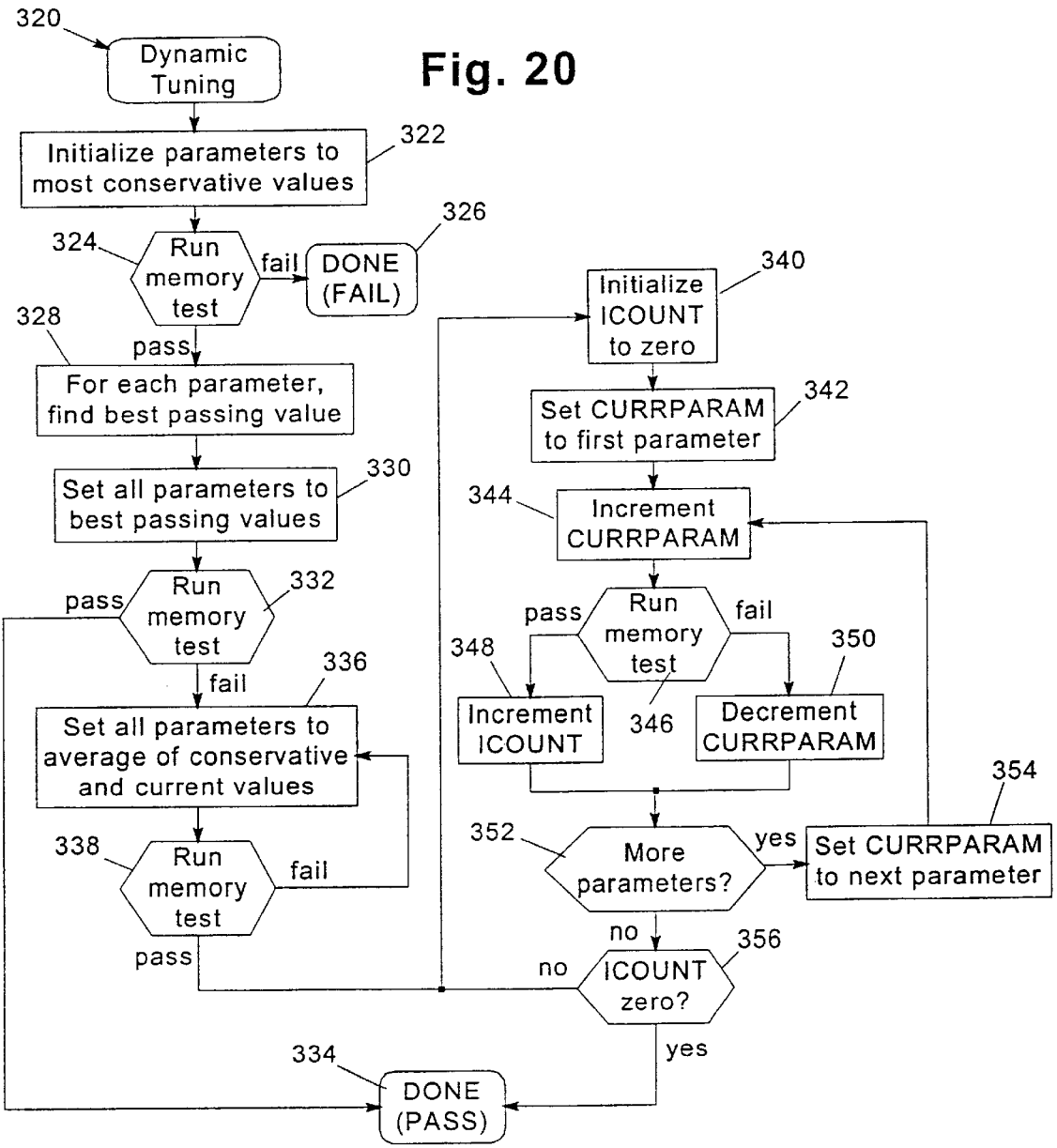
FIG. 20 is a flowchart illustrating an alternate sequence of operations performed by the dynamic tuning logic to that of FIG. 14.

FIG. 20 next illustrates at 320 a sequence of operations that may be performed by a controller/sequencer to perform independent tuning of multiple parameters using parameter manipulation control block 224" of FIG. 19. Starting at block 322, each available parameter is initialized to its most conservative value, e.g., by latching the UPPER LIMIT signal from each binary search engine 259 into its associated latch 302 (FIG. 19). Next, memory testing is performed in block 324. If a fail result is returned from the memory test controller, control passes to block 326 to terminate the tuning operation and indicate a failure (e.g., by asserting a tune fail signal from the controller/sequencer as shown in FIG. 13).

If a pass result is returned, however, control passes to block 328 to find the best passing value for each parameter. With block 224" of FIG. 19, such an operation includes sequentially performing a tuning operation for each binary search engine, e.g., in the manner discussed above with respect to FIG. 15, with the additional operation of latching the CURRENT VALUE signal output from each binary search engine into the associated latch to modify the parameter value used during each memory test. Upon completion of each tuning operation, the associated parameter would be returned to its most conservative value as in block 322 to permit subsequent parameters to be tested independently and free from any potential errors due to optimizations of earlier parameters. Next, in block 330, all parameters are set to their optimized values, by sequentially latching the CURRENT VALUE signal output from each binary search engine into the associated latch. A memory test is rerun in block 332, and if a pass result is returned, the tuning operation is complete, and a tune pass result is output from the controller/sequencer, as represented at block 334.

If the memory test fails, control passes to block 336 to set each parameter to the average of its conservative and current values, by sequentially latching the output of each average block 304 into its associated latch 302 (FIG. 19). The memory test is then rerun in block 338. If a fail result is returned, control passes back to block 336 to again average the current value in each latch with the associated conservative value for than parameter. If a pass result is instead returned, control passes to block 340 to begin testing individual parameters to obtain additional optimizations for the parameters.

Block 340 initializes a variable ICOUNT to zero. ICOUNT is used to count the number of parameters that were successfully optimized during a current cycle (or pass) of the tuning operation (represented by blocks 340–356). Block 342 next sets the current parameter (CURRPARAM) to the first parameter, so that the CURRPARAM signal selects the binary search engine and latch for the first parameter. Block 344 then increments the value stored in the latch for the current parameter, by asserting the INC PARAM signal while the CURRPARAM signal selects the appropriate latch.

Next, in block 346, the memory test is rerun, and if a pass result is returned, control passes to block 348 to increment the ICOUNT variable to indicate that a successful optimization has occurred. If a fail result is returned, control passes to block 350 to decrement the current parameter by asserting the DEC PARAM signal while the CURRPARAM signal selects the appropriate latch.

After either of blocks 348, 350, control passes to block 352 to determine whether additional parameters remain to be processed. If so, control passes to block 354 to select the next parameter as the current parameter, so the CURRPARAM signal selects the binary search engine and latch for that parameter. Control then returns to block 344 to increment such parameter and rerun the memory test.

Once all parameters have been processed, block 352 passes control to block 356 to determine whether the ICOUNT variable is zero, indicating that no successful optimizations occurred in the current cycle of the tuning operation. If a non-zero result is returned, additional optimization may be possible, so control returns to block 340 to set ICOUNT to zero and being another tuning operation cycle. If ICOUNT is zero, control passes to block 334, and the tuning operation is complete.

It should be appreciated that the implementation of the sequence of operations described herein for a controller/sequencer, and in particular those illustrated in FIGS. 14 and 20, is well within the abilities of one of ordinary skill in the art having the benefit of the instant disclosure. Moreover, other operational sequences may be used in the alternative.

Various modifications may be made to the illustrated embodiments without departing from the spirit and scope of the invention. For example, rather than testing each parameter individually, while all other parameters are set to conservative values, parameters could be optimized one after another and left in optimized states while subsequent parameters are optimized.

Other modifications may be made to the illustrated embodiments without departing from the spirit and scope of the invention. Therefore, the invention lies in the claims hereinafter appended.

What is claimed is:

1. A circuit arrangement for use in determining an optimum value from a monotonically-sorted list of values, the circuit arrangement comprising:

(a) first and second registers respectively configured to store first and second values from the list of values;

(b) an averaging circuit coupled to receive the first and second values stored in the first and second registers, and to output as a test value an average of the first and second values;

(c) a test circuit, coupled to the first and second registers, the test circuit configured to test the test value according to a predetermined comparison criteria, wherein, in response to the test value meeting the predetermined comparison criteria, the first register is configured to be updated with the test value, and, in response to the test value not meeting the predetermined comparison criteria, the second register is configured to be updated with the test value; and (d) a test closure circuit configured to determine when an optimum value is stored in the first register.

2. The circuit arrangement of claim 1, wherein the averaging circuit comprises:

(a) an adder circuit configured to output a sum of the first and second values from the first and second registers; and (b) a divide by two circuit configured to divide the sum of the first and second values by two.

3. The circuit arrangement of claim 2, wherein the divide by two circuit comprises a right shift circuit.

4. The circuit arrangement of claim 1, wherein the test closure circuit includes a subtractor circuit, the subtractor circuit configured to output a complete signal when the difference between the first and second values is one.

5. The circuit arrangement of claim 1, wherein the first and second registers are configured to be initialized respectively to upper and lower limits of the list of values.

6. The circuit arrangement of claim 1, wherein the list of values represents a list of delay values for use in controllably setting a delay between performing first and second memory control operations on a memory storage device, wherein the test circuit comprises a memory test control circuit configured to perform a memory test on the memory storage device, and wherein the test circuit is configured to test the test value according to the predetermined comparison criteria by determining whether the memory storage device passes the memory test.

7. An integrated circuit device comprising the circuit arrangement of claim 1.

8. A data processing system comprising the circuit arrangement of claim 1.

9. A program product, comprising a hardware definition program that defines the circuit arrangement of claim 1; and a signal bearing media bearing the hardware definition program.

* * * * *